US012333885B2

(12) United States Patent
Onishi et al.

(10) Patent No.: US 12,333,885 B2
(45) Date of Patent: Jun. 17, 2025

(54) MONEY HANDLING APPARATUS AND MONEY HANDLING METHOD

(71) Applicant: GLORY LTD., Himeji (JP)

(72) Inventors: Shuji Onishi, Hyogo (JP); Kazuaki Nishimura, Hyogo (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/589,484

(22) Filed: Feb. 28, 2024

(65) Prior Publication Data

US 2024/0203188 A1 Jun. 20, 2024

Related U.S. Application Data

(63) Continuation of application No. PCT/JP2022/032326, filed on Aug. 29, 2022.

(30) Foreign Application Priority Data

Sep. 3, 2021 (JP) ................................. 2021-143966

(51) Int. Cl.
*G07D 11/13* (2019.01)
*G07D 11/235* (2019.01)
*G07D 11/26* (2019.01)

(52) U.S. Cl.
CPC ........... *G07D 11/13* (2019.01); *G07D 11/235* (2019.01); *G07D 11/26* (2019.01)

(58) Field of Classification Search
CPC ....... G07D 11/13; G07D 11/26; G07D 11/235
(Continued)

(56) References Cited

U.S. PATENT DOCUMENTS 11,699,332 B2 * 7/2023 Fraser ................... G07F 19/205 235/379
2010/0213661 A1 8/2010 Fukazawa et al.
(Continued)

FOREIGN PATENT DOCUMENTS

JP 2009-070056 4/2009
JP 5821604 11/2015
(Continued)

OTHER PUBLICATIONS

International Search Report and Written Opinion for International Application No. PCT/JP2022/032326 mailed on Oct. 11, 2022, 9 pages.

(Continued)

*Primary Examiner* — Daniel A Hess
(74) *Attorney, Agent, or Firm* — Amin, Turocy & Watson, LLP

(57) ABSTRACT

A money handling apparatus capable of appropriately performing operation on handling of money depending on presence or absence of cooperation between the money handling apparatus and an external apparatus. The money handling apparatus includes a transport unit that transports money, an attachment unit that allows a cassette for storing money to be attached and detached, and a control unit that performs predetermined handling on money. When performing the predetermined handling, the control unit alternatively selects a destination of transport of money to be transported by the transport unit from between the cassette and a place other than the cassette, based on a cooperation status between the money handling apparatus and the external apparatus.

10 Claims, 8 Drawing Sheets

(58) Field of Classification Search
USPC .......................................................... 235/486
See application file for complete search history.

(56) References Cited

U.S. PATENT DOCUMENTS

| | | | | |
|---|---|---|---|---|
| 2015/0243119 | A1* | 8/2015 | Hayashi | G07D 11/14<br>194/206 |
| 2018/0025570 | A1 | 1/2018 | Nishida et al. | |
| 2018/0040187 | A1* | 2/2018 | Jeong | G07D 11/125 |
| 2018/0286164 | A1* | 10/2018 | Lee | G07F 19/205 |
| 2022/0207951 | A1 | 6/2022 | Nada | |

FOREIGN PATENT DOCUMENTS

| | | |
|---|---|---|
| JP | 2016-105336 | 6/2016 |
| JP | 2016-146141 | 8/2016 |
| JP | 2016-164773 | 9/2016 |
| JP | 2021-056742 | 4/2021 |

OTHER PUBLICATIONS

Extended European Search Report for European Patent Application No. 22864465.4 dated Nov. 22, 2024.

* cited by examiner

MONEY HANDLING APPARATUS AND MONEY HANDLING METHOD

CROSS REFERENCE TO RELATED APPLICATIONS

The present application is a Continuation application of PCT International application PCT/JP2022/032326 filed on Aug. 29, 2022, which claims priority to JP2021-143966 filed on Sep. 3, 2021, the entire contents of each of which incorporated herein by reference.

TECHNICAL FIELD

The present disclosure relates to a money handling apparatus and a money handling method.

BACKGROUND ART

Hitherto, there is known a cash handling system that handles deposit and withdrawal of cash. An existing cash handling system includes a cash settlement apparatus placed in a shop, and a cashier apparatus and a cash management apparatus placed in a back office of the shop. A cash transport cassette that includes a memory unit is attached to and detached from the cash settlement apparatus and the cashier apparatus.

Change fund to be loaded in the cash settlement apparatus is stored in the cash transport cassette. Cash collected from the cash settlement apparatus and overflow money are stored in the cash transport cassette. Overflow money means cash that cannot be stored in a storage unit that is a destination of storage in the cash settlement apparatus because the storage unit is full. Such a cash transport cassette is used to transport cash between the cash settlement apparatus and the cashier apparatus at the time of loading change fund or at the time of collecting cash in the cash settlement apparatus. Then, the cash management apparatus manages such an exchange of cash between the cash settlement apparatus and the cashier apparatus based on, for example, information stored in the memory unit of the cash transport cassette.

SUMMARY

A money handling apparatus according to the present disclosure includes a transport unit that transports money, an attachment unit that allows a cassette for storing money to be attached and detached, and a control unit that performs predetermined handling on money. When performing the predetermined handling, the control unit alternatively selects a destination of transport of money to be transported by the transport unit from between the cassette and a place other than the cassette, based on cooperation information indicating details related to a cooperation status between the money handling apparatus and an external apparatus.

DESCRIPTION OF EMBODIMENTS

Figure 1:
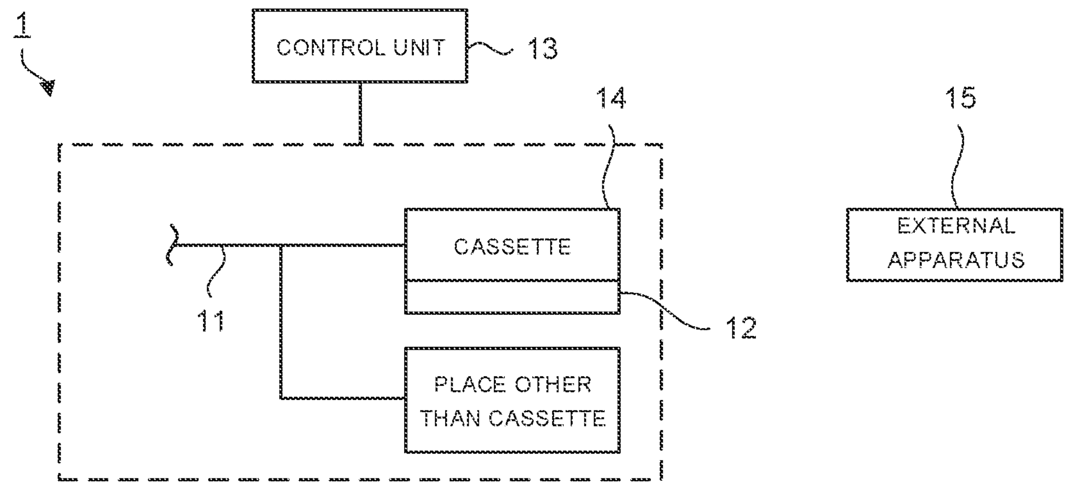
FIG. 1 is a block diagram of a money handling apparatus according to Embodiment 1.

Some shops do not manage cash stored in a money handling apparatus, such as a cash settlement apparatus, by an external apparatus placed in a back office. At such shops, it is not possible to use cassettes to be used in a system for managing cash in the money handling apparatus by the external apparatus.

The present disclosure provides a money handling apparatus and a money handling method capable of appropriately performing operation on handling of money based on presence or absence of cooperation between the money handling apparatus and an external apparatus.

A money handling apparatus according to the present disclosure includes: a transport unit that transports money; an attachment unit that allows a cassette for storing money to be attached and detached; and a control unit that performs predetermined handling on money, wherein when performing the predetermined handling, the control unit alternatively selects a destination of transport of money to be transported by the transport unit from between the cassette and a place other than the cassette, based on cooperation information indicating details related to a cooperation status between the money handling apparatus and an external apparatus.

In the money handling apparatus according to the present disclosure, the control unit may select the cassette as the destination of transport in the predetermined handling when the cooperation information acquired is information indicating that the money handling apparatus and the external apparatus are in cooperation with each other, and select the place other than the cassette as the destination of transport in the predetermined handling when it is not possible to acquire the cooperation information or when the cooperation information acquired is information indicating that the money handling apparatus and the external apparatus are not in cooperation with each other.

The money handling apparatus according to the present disclosure may further include a setting unit for setting the cooperation information.

In the money handling apparatus according to the present disclosure, the cassette may include a memory unit that stores the cooperation information, and the control unit may acquire the cooperation information from the memory unit of the cassette attached to the attachment unit.

The money handling apparatus according to the present disclosure may further include a communication unit that communicates with the external apparatus, wherein the control unit may acquire the cooperation information from the external apparatus via the communication unit.

In the money handling apparatus according to the present disclosure, the cooperation information may be inventory amount information indicating an inventory amount of the cassette.

In the money handling apparatus according to the present disclosure, the inventory amount information may be information on an amount of money loaded in the cassette by the external apparatus.

The money handling apparatus according to the present disclosure may further include: a recognition unit that recognizes money transported by the transport unit; and a storage unit that stores money recognized by the recognition unit, wherein the control unit may control the transport unit such that the money stored in the cassette is transported to the recognition unit, and the money recognized as being normal by the recognition unit is transported to the storage unit whereas the money recognized as being abnormal by the recognition unit is transported to the place other than the storage unit, and the predetermined handling may include handling for transporting the money recognized as being abnormal by the recognition unit to the place other than the storage unit.

The money handling apparatus according to the present disclosure may further include a storage unit that stores money, wherein the control unit may control the transport unit such that the money stored in the cassette is transported to the storage unit when the control unit determines that the money stored in the cassette is allowed to be stored in the storage unit, whereas the money stored in the cassette is transported to the place other than the storage unit when the control unit determines that the money stored in the cassette is not allowed to be stored in the storage unit, and the predetermined handling may include handling for transporting the money determined as being not allowed to be stored in the storage unit, to the place other than the storage unit.

In the money handling apparatus according to the present disclosure, the control unit may control the transport unit such that the transport unit interrupts transport of money when an error of handling on money occurs, whereas transport of money having been being transported by the transport unit at time of occurrence of the error is resumed when the error is eliminated, and the predetermined handling may include handling for resuming the transport of money having been being transported by the transport unit at time of occurrence of the error.

In the money handling apparatus according to the present disclosure, when a state of money being stored in the cassette shifts to a state of money not being stored in the cassette after the control unit selects the place other than the cassette as the destination of transport, the control unit may switch the destination of transport to the cassette when performing the predetermined handling.

A money handling method according to the present disclosure is a method executed by a money handling apparatus including a transport unit that transports money and an attachment unit that allows a cassette for storing money to be attached and detached, the money handling method including, when performing predetermined handling on money, alternatively selecting, by the money handling apparatus, a destination of transport of money to be transported by the transport unit from between the cassette and a place other than the cassette, based on cooperation information indicating details related to a cooperation status between the money handling apparatus and an external apparatus.

With the money handling apparatus and the money handling method according to the present disclosure, it is possible to appropriately perform operation on handling of money depending on presence or absence of cooperation between the money handling apparatus and an external apparatus.

Embodiment 1

Embodiment 1 will be described with reference to the attached drawings.

Configuration of Money Handling Apparatus

Initially, the configuration of a money handling apparatus will be described. FIG. 1 is a block diagram of the money handling apparatus.

The money handling apparatus 1 shown in FIG. 1 handles money. Money that is handled by the money handling apparatus 1 may be coins or may be banknotes. The money handling apparatus 1 includes a transport unit 11, an attachment unit 12, and a control unit 13.

The transport unit 11 transports money. The transport unit 11 transports money present at a source of transport to a cassette 14 (described later) attached to the attachment unit 12 or a place other than the cassette 14. A source of transport is, for example, a deposit unit for feeding money to the inside of the money handling apparatus 1. A source of transport may be a money storage unit in the money handling apparatus 1, other than the cassette 14. A source of transport may be the cassette 14 itself. The place other than the cassette 14 may be outside the money handling apparatus 1. When the place other than the cassette 14 is outside the money handling apparatus 1, a manager of the money handling apparatus 1 is able to easily collect money of which the inventory amount is not managed if there is no cooperation between the money handling apparatus 1 and an external apparatus 15 (described in detail later). For example, a withdrawal unit for withdrawing money to the outside of the money handling apparatus 1 may be illustrated as the place other than the cassette 14. The place other than the cassette 14 may be the money storage unit in the money handling apparatus 1.

The cassette 14 is detachably attached to the attachment unit 12. The cassette 14 is configured to be capable of storing money transported by the transport unit 11 inside the cassette 14 when the cassette 14 is attached to the attachment unit 12. The money handling apparatus 1 is configured to be capable of cooperating with the external apparatus 15. The external apparatus 15 manages the inventory amount of the cassette 14. Therefore, when the money handling apparatus 1 and the external apparatus 15 are in cooperation with each other, the money handling apparatus 1 is also capable of managing the inventory amount of the cassette 14. The money handling apparatus 1 and the external apparatus 15 are capable of managing money in the cassette 14 so that the inventory amount in the cassette 14 can be confirmed. A management apparatus that communicates with the money handling apparatus 1 and the external apparatus 15 and that manages the inventory amount of the cassette 14 may be provided separately.

At the time of performing predetermined handling on money, the control unit 13 alternatively selects a destination of transport of money from between the cassette 14 and the place other than the cassette 14 based on a cooperation status between the money handling apparatus 1 and the external apparatus 15. The place other than the cassette 14 may be selected from a plurality of destinations of transport. The control unit 13 may determine a cooperation status between the money handling apparatus 1 and the external apparatus 15 based on cooperation information acquired from the external apparatus 15. When the cassette 14 includes a memory unit, the control unit 13 may determine a cooperation status between the money handling apparatus 1 and the external apparatus 15 based on cooperation information acquired from the memory unit of the cassette 14.

Operation of Money Handling Apparatus

Figure 2A:
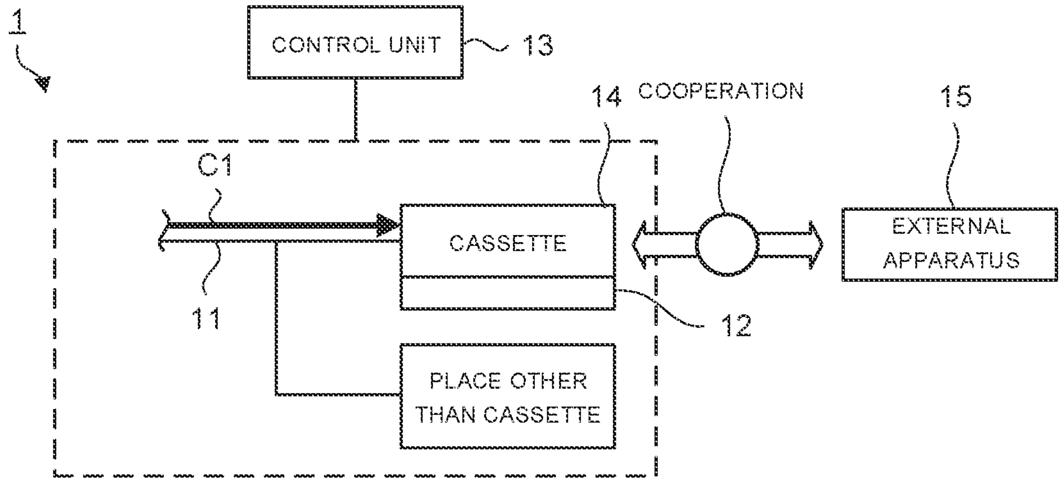
FIG. 2A is a block diagram illustrating the operation of the money handling apparatus in a case where there is cooperation between the money handling apparatus according to Embodiment 1 and an external apparatus.
Figure 2B:
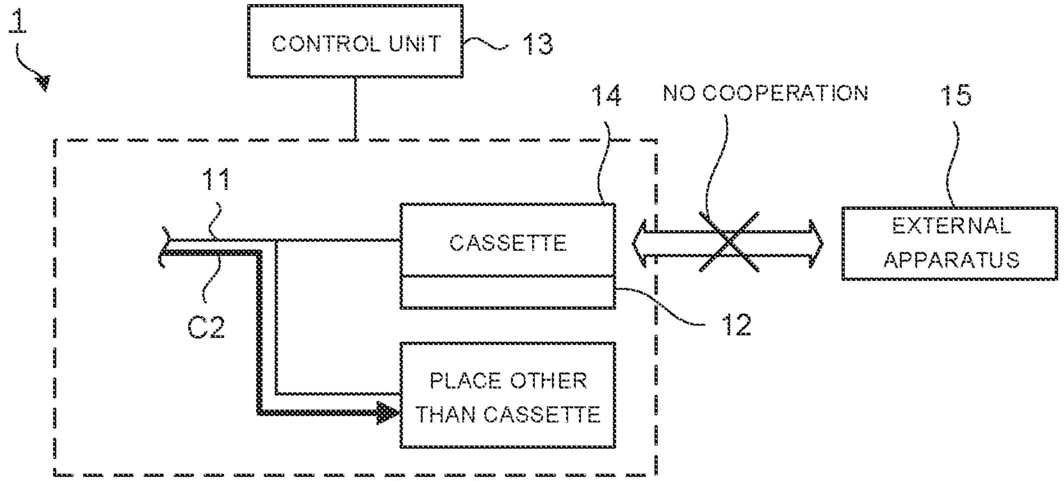
FIG. 2B is a block diagram illustrating the operation of the money handling apparatus in a case where there is no cooperation between the money handling apparatus according to Embodiment 1 and the external apparatus.

Next, the operation of the money handling apparatus 1 will be described. FIG. 2A is a block diagram illustrating the operation of the money handling apparatus in a case where there is cooperation between the money handling apparatus and the external apparatus. FIG. 2B is a block diagram illustrating the operation of the money handling apparatus in a case where there is no cooperation between the money handling apparatus and the external apparatus.

The control unit 13 determines whether there is cooperation between the money handling apparatus 1 and the external apparatus 15. Then, when the control unit 13 determines that there is cooperation between the money handling apparatus 1 and the external apparatus 15, the control unit 13, at the time of performing predetermined handling accompanied by transport of money, controls the transport unit 11 such that money present at a source of transport is transported to the cassette 14 as indicated by the arrow C1 in FIG. 2A. On the other hand, when the control unit 13 determines that there is no cooperation between the money handling apparatus 1 and the external apparatus 15, the control unit 13, at the time of performing predetermined handling, controls the transport unit 11 such that money is transported to the place other than the cassette 14 as indicated by the arrow C2 in FIG. 2B.

The reason why a destination of transport of money is varied depending on presence or absence of cooperation between the money handling apparatus 1 and the external apparatus 15 in this way is as follows. The external apparatus 15 manages the inventory amount of money stored in the cassette 14. When there is cooperation between the money handling apparatus 1 and the external apparatus 15, the money handling apparatus 1 is also capable of managing the inventory amount of the cassette 14. Then, when there is cooperation between the money handling apparatus 1 and the external apparatus 15, the money handling apparatus 1 transports money to the cassette 14. In this way, the money handling apparatus 1 is capable of managing the inventory amount of money in the cassette 14 by transporting the money to the cassette 14. For example, the external apparatus 15 may be an apparatus comprising a function of loading the cassette 14 attached to the external apparatus 15, with money. The external apparatus 15 may include a function of taking in money discharged from the cassette 14 attached to the external apparatus 15. In a situation in which the money handling apparatus 1 and the external apparatus 15 are in cooperation with each other, movement of money between the money handling apparatus 1 and the external apparatus 15 is performed by using the cassette 14, and the amount of money moved is managed. When money is moved from the external apparatus 15 to the money handling apparatus 1, the external apparatus 15 loads the cassette 14 with money. The external apparatus 15 manages the inventory amount of money loaded in the cassette 14. The cassette 14 is removed from the external apparatus 15 and is then attached to the money handling apparatus 1. Since the money handling apparatus 1 and the external apparatus 15 are in cooperation with each other, the money handling apparatus 1 is capable of acquiring the inventory amount of the cassette 14. A situation in which the money handling apparatus 1 and the external apparatus 15 are in cooperation with each other may be regarded as a situation in which the money handling apparatus 1 has been capable of managing the inventory amount of the cassette 14.

On the other hand, when there is no cooperation between the money handling apparatus 1 and the external apparatus 15, the money handling apparatus 1 is not capable of acquiring the inventory amount of the cassette 14. Therefore, if money is transported to the cassette 14, there occurs an inconvenience that money of which the inventory amount is managed and money of which the inventory amount is not managed are mixed. For this reason, when there is no cooperation between the money handling apparatus 1 and the external apparatus 15, the money handling apparatus 1 does not transport money to the cassette 14 but transports money to the place other than the cassette 14. In this way, when money is transported to the place other than the cassette 14, it is possible to prevent occurrence of an inconvenience that money of which the inventory amount is managed and money of which the inventory amount is not managed are mixed.

Therefore, the money handling apparatus 1 according to Embodiment 1 is capable of appropriately performing operation on handling of money depending on presence or absence of cooperation between the money handling apparatus 1 and the external apparatus 15.

Embodiment 2

Next, Embodiment 2 will be described with reference to the attached drawings. In Embodiment 2, a coin handling apparatus that is an example of the money handling apparatus will be described.

Configuration of Coin Handling Apparatus

Figure 3:
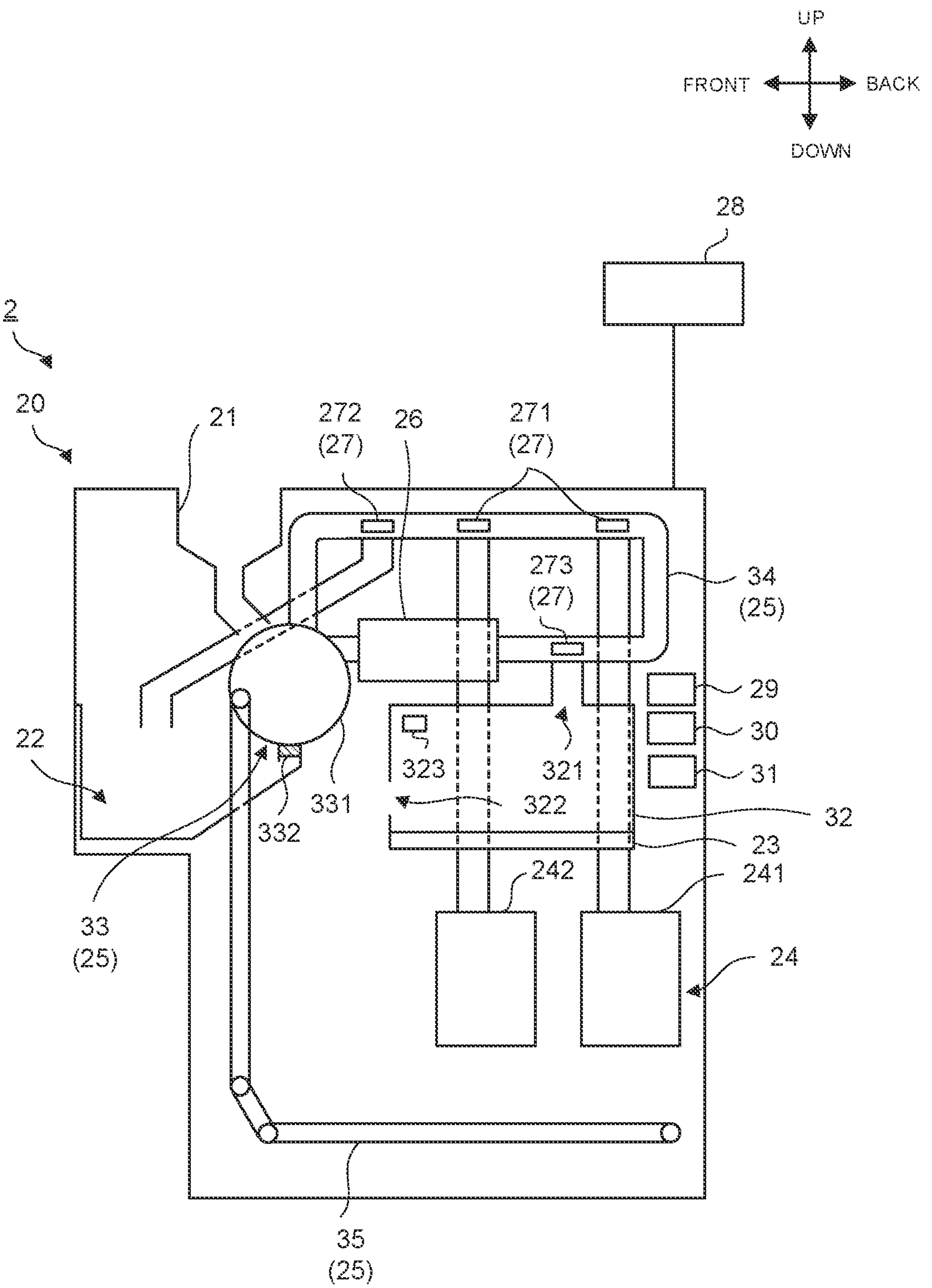
FIG. 3 is a schematic diagram of the internal configuration of a coin handling apparatus according to Embodiment 2.

Initially, the configuration of the coin handling apparatus will be described. FIG. 3 is a schematic diagram of the internal configuration of the coin handling apparatus. In the following description, a front side is a side to which a clerk or a customer of a shop, in which the coin handling apparatus is installed, faces, and a back side is a side opposite to the front side. A right-hand side is a right-hand side when viewed from the clerk or the customer, and a left-hand side is a side opposite to the right-hand side. An upper side is an upper side when the coin handling apparatus is installed on a horizontal plane, and a lower side is a side opposite to the upper side.

The coin handling apparatus 2 shown in FIG. 3 performs handling on coins that are an example of money. For example, deposit and withdrawal can be illustrated as handling on coins. The coin handling apparatus 2 includes a casing 20, a deposit unit 21, a withdrawal unit 22, an attachment unit 23, a recycling storage unit 24, a transport unit 25, a recognition unit 26, a plurality of chutes 27, an operation display unit 28, a memory 30, and a control unit 31. The coin handling apparatus 2 may include a communication unit 29.

The deposit unit 21 is provided in front of a top face part of the casing 20. The deposit unit 21 is configured to allow coins to be deposited into the coin handling apparatus 2. The withdrawal unit 22 is provided at an upper side on a front face part of the casing 20. The withdrawal unit 22 is configured to allow coins to be withdrawn from the coin handling apparatus 2.

A cassette 32 is detachably attached to the attachment unit 23. The attachment unit 23 is hidden by a cover when the cassette 32 is not attached and is exposed when the cover is open. The cassette 32 includes a receiving inlet 321 for storing coins into the cassette 32, a discharge outlet 322 for discharging coins in the cassette 32, and a connector. The cassette 32 may include a memory unit 323. The cassette 32 may further include a cassette transport unit for transporting coins in the cassette 32 to the discharge outlet 322. The cassette 32 may include an open-close door and may be configured so that a clerk is able to open the open-close door and manually put (manually load) coins into the cassette 32. When a clerk attaches the cassette 32 to the attachment unit 23, a connector of the cassette 32 is connected to a connector of the attachment unit 23, with the result that the control unit 31 is enabled to control the cassette 32.

The recycling storage unit 24 is an example of the storage unit according to the present disclosure. The recycling storage unit 24 may be a mixed storage unit for storing a plurality of denominations in a mixed state. The mixed storage unit is configured to be capable of storing coins and feeding out the stored coins. The recycling storage unit 24 may include a plurality of (two in Embodiment 2) denomination-specific storage units 241, 242 (hereinafter, which may be referred to as the first denomination-specific storage unit 241 and the second denomination-specific storage unit 242). The first denomination-specific storage unit 241 and the second denomination-specific storage unit 242 are configured to be capable of storing coins and feeding out the stored coins. A denomination of coins stored in the first denomination-specific storage unit 241 and a denomination of coins stored in the second denomination-specific storage unit 242 are set in advance.

The transport unit 25 includes a feed-out unit 33, a deposit transport path 34, and a withdrawal transport path 35.

The feed-out unit 33 is configured to receive coins deposited from the deposit unit 21 and feed out the coins one by one. The feed-out unit 33 includes a hopper 331 that temporarily holds a plurality of coins and a feed-out mechanism that feeds out coins in the hopper 331 one by one. For example, a mechanism of using a rotary disk that rotates in an inclined state and picking up and feeding out coins one by one with a plurality of protruding members in an outer region of the surface of the rotary disk may be illustrated as the feed-out mechanism. The feed-out unit 33 may be configured to be capable of dropping coins received inside to the withdrawal unit 22. The feed-out unit 33 is configured to be capable of discharging coins to the withdrawal unit 22 by opening a bottom part 332 of the hopper 331.

The deposit transport path 34 transports coins fed out from the feed-out unit 33. The deposit transport path 34 separates coins and transports the coins one by one. The deposit transport path 34 may be configured as a loop shape to be capable of transporting coins to the back side and then returning the coins to the feed-out unit 33. A known coin transport mechanism may be applied as a specific mechanism of the deposit transport path 34. The deposit transport path 34 is made up of a combination of, for example, rollers, a belt wound around the rollers, a motor for driving the rollers, side walls, and the like.

The withdrawal transport path 35 is provided below the recycling storage unit 24 and the attachment unit 23. The withdrawal transport path 35 transports coins, fed out from the first denomination-specific storage unit 241 and the second denomination-specific storage unit 242, to the feed-out unit 33. The withdrawal transport path 35 transports coins, discharged and dropped from the cassette 32, to the feed-out unit 33. Coins transported to the feed-out unit 33 are discharged to the withdrawal unit 22 via the bottom part 332 of the hopper 331. Coins transported to the feed-out unit 33 may be fed out to the deposit transport path 34, recognized by the recognition unit 26, and discharged to the withdrawal unit 22 via a chute 272.

The recognition unit 26 is provided in the deposit transport path 34. The recognition unit 26 recognizes, for example, the denomination, authenticity, fitness, and the like of coins to be transported by the deposit transport path 34. The recognition unit 26 includes, for example, at least one of an image sensor, an optical sensor, and a magnetic sensor. The recognition unit 26 determines the denomination, authenticity, fitness, and the like of coins and counts the coins separately by denomination based on information acquired by the sensor.

The plurality of chutes 27 is provided downstream of the recognition unit 26 in the deposit transport path 34 in a coin transport direction. The plurality of chutes 27 is provided so as to be lined in the coin transport direction. Two chutes 271 of the plurality of chutes 27 are configured to be capable of respectively guiding coins to the first denomination-specific storage unit 241 and the second denomination-specific storage unit 242. Another chute 272 is configured to be capable of guiding coins to the withdrawal unit 22. A remaining one chute 273 is configured to be capable of guiding coins to the cassette 32. Each of the chutes 27 is normally closed by a gate and guides coins to the unit by opening the gate.

The operation display unit 28 is a touch panel display apparatus. The operation display unit 28 functions as an operation unit for inputting information on coin handling in the coin handling apparatus 2 and a display unit that displays information on coin handling. The operation display unit 28 may be configured separately from the coin handling apparatus 2 or may be configured integrally with the coin handling apparatus 2. The operation display unit 28 may be configured such that the operation unit and the display unit are provided independently of each other.

The communication unit 29 communicates with an external apparatus. The memory 30 is capable of storing various pieces of information. The inventory amounts of the cassette 32, the first denomination-specific storage unit 241, and the second denomination-specific storage unit 242 may be illustrated as information to be stored in the memory 30.

The control unit 31 controls the overall operation of the coin handling apparatus 2. The control unit 31 is, for example, circuitry or processing circuitry which includes general purpose processors, special purpose processors, integrated circuits, ASICs ("Application Specific Integrated Circuits"), conventional circuitry and/or combinations thereof. As will be described in detail later, at the time of performing predetermined handling on coins, the control unit 31 controls the transport unit 25 such that coins are transported to the cassette 32 or a place other than the cassette 32, based on a cooperation status between the coin handling apparatus 2 and an external apparatus.

Application Examples of Coin Handling Apparatus

Figure 4A:
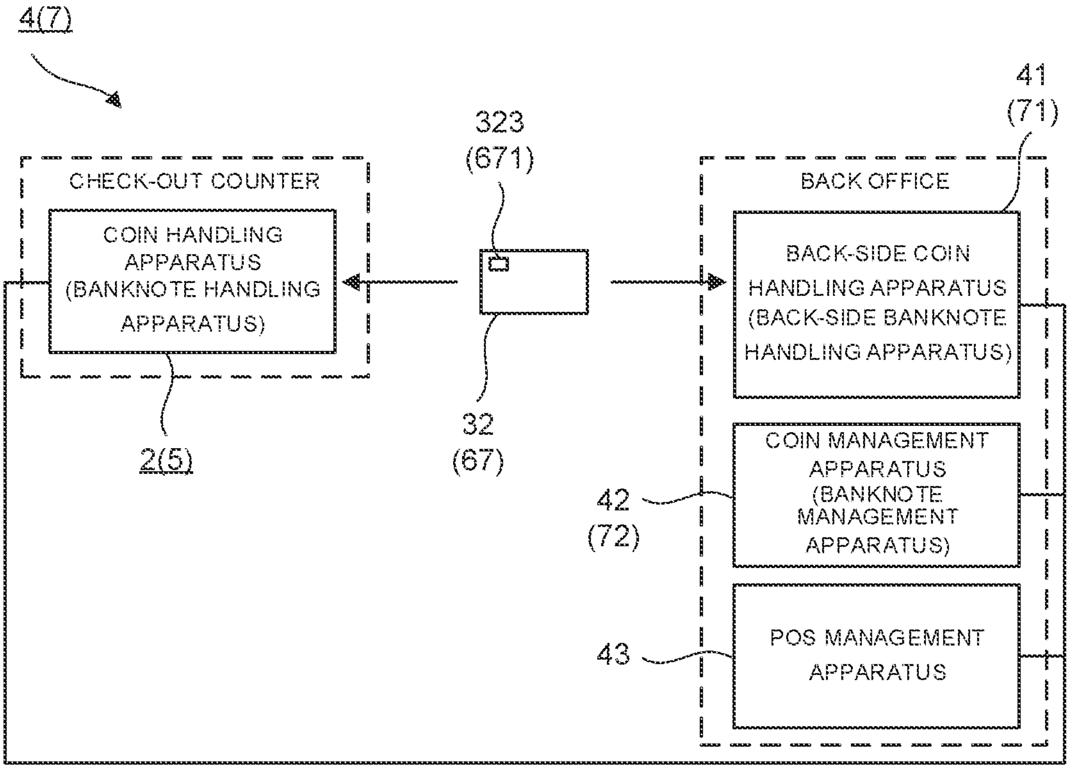
FIG. 4A is a block diagram of a first application example of the coin handling apparatus according to Embodiment 2 and a banknote handling apparatus according to Embodiment 3.
Figure 4B:
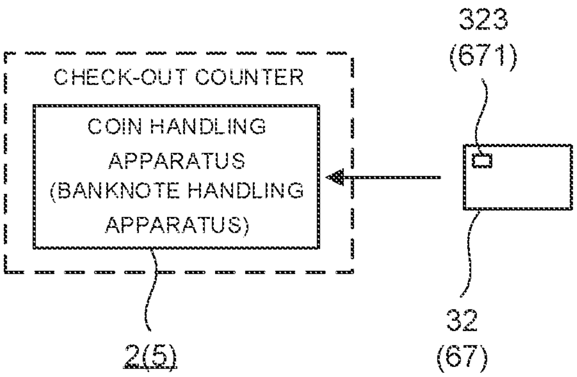
FIG. 4B is a block diagram of a second application example of the coin handling apparatus according to Embodiment 2 and the banknote handling apparatus according to Embodiment 3.

Next, application examples of the coin handling apparatus 2 will be described. FIG. 4A is a block diagram of a first application example of the coin handling apparatus. FIG. 4B is a block diagram of a second application example of the coin handling apparatus.

Configuration of First Application Example

Initially, the configuration of the first application example will be described. As shown in FIG. 4A, in the first application example, the coin handling apparatus 2 is applied to a coin handling system 4. The coin handling system 4 is a system intended for distribution and is installed in a shop. The coin handling system 4 includes the coin handling apparatus 2, a back-side coin handling apparatus 41, and the cassette 32. The coin handling system 4 may include a coin management apparatus 42. The coin handling system 4 may include a POS management apparatus 43. The coin handling system 4 may include one or three or more coin handling apparatuses 2. As will be described later, inventory amount information indicating the inventory amount of the cassette 32 is stored (managed) in at least one of the back-side coin handling apparatus 41 and the coin management apparatus 42 that are examples of the external apparatus. In Embodiment 2, as in the case of the first application example, a situation in which the inventory amount of the cassette 32 is managed by the coin handling apparatus 2 and the external apparatus means a situation in which the coin handling apparatus 2 and the external apparatus are in cooperation with each other.

The coin handling apparatus 2 is installed in a check-out counter that is an example of a front office of a shop. The coin handling apparatus 2 is operated by a clerk or a customer by him or herself and is used to perform settlement between the shop and the customer. The coin handling apparatus 2 is communicably connected to a POS register that is operated by a clerk or a self-check-out register that is operated by a customer. The coin handling apparatus 2 deposits money paid by a customer or withdraws change to be paid to the customer. The control unit 31 of the coin handling apparatus 2 controls the overall coin handling apparatus 2 such that change fund prepared in the back-side coin handling apparatus 41 is received from the cassette 32 and proceeds from sales are passed to the cassette 32.

The cassette 32 is configured to be allowed to be detachably attached to the coin handling apparatus 2 or the back-side coin handling apparatus 41. The memory unit 323 of the cassette 32 is capable of storing cooperation information that means that the coin handling apparatus 2 is in cooperation with the external apparatus (the back-side coin handling apparatus 41 or the coin management apparatus 42). As will be described later, cooperation information is associated with information indicating a destination of transport of coins in a case where the coin handling apparatus 2 performs predetermined handling. Cooperation information may include information indicating a destination of transport. A destination of transport corresponding to cooperation information in the first application example is the cassette 32. Recording of cooperation information to the memory unit 323, for example, may be performed by the back-side coin handling apparatus 41 or the coin handling apparatus 2 or may be performed by an apparatus at a source of shipment at the time of shipment of the cassette 32.

The memory unit 323 is, for example, a memory apparatus, such as a memory and a storage, provided in the cassette 32 and is capable of storing inventory amount information of the cassette 32. The fact that the memory unit 323 stores inventory amount information of the cassette 32 means that the coin handling apparatus 2 is in cooperation with the external apparatus. In other words, inventory amount information can function as cooperation information. Recording of inventory amount information to the memory unit 323 is performed by, for example, the back-side coin handling apparatus 41.

The back-side coin handling apparatus 41, the coin management apparatus 42, and the POS management apparatus 43 are installed in the back office of a shop. The back-side coin handling apparatus 41 is communicably connected to the coin handling apparatus 2. The back-side coin handling apparatus 41 includes a cassette attachment apparatus to which the cassette 32 is attached. The back-side coin handling apparatus 41 withdraws change fund for loading the coin handling apparatus 2 to the cassette 32 or proceeds from sales collected from the coin handling apparatus 2 are received from the cassette 32.

At the time of withdrawing change fund to the cassette 32, the back-side coin handling apparatus 41 is capable of storing inventory amount information on the amount (inventory amount) of coins withdrawn to the cassette 32. The back-side coin handling apparatus 41 is capable of storing inventory amount information of the cassette 32 in the memory unit 323 of the cassette 32 or sending the inventory amount information to the coin handling apparatus 2 or the coin management apparatus 42. The back-side coin handling apparatus 41 is capable of storing cooperation information in the memory unit 323 of the cassette 32 or sending the cooperation information to the coin handling apparatus 2.

The coin management apparatus 42 is communicably connected to the coin handling apparatus 2 and the back-side coin handling apparatus 41. The coin management apparatus 42 manages coins (inventory amount) stored in the coin handling apparatus 2 and the back-side coin handling apparatus 41. For example, the coin management apparatus 42 manages information on coins used for settlement in the coin handling apparatus 2 and coins exchanged between the coin handling apparatus 2 and the back-side coin handling apparatus 41. The coin management apparatus 42 is capable of managing the inventory amount of the cassette 32. The coin management apparatus 42 is capable of sending inventory amount information of the cassette 32 to the coin handling apparatus 2. The POS management apparatus 43 manages flow of goods.

Configuration of Second Application Example

Next, the configuration of the second application example will be described. As shown in FIG. 4B, in the second application example, the coin handling apparatus 2 is solely used. In the second application example, the inventory amount of the cassette 32 is not managed by the external apparatus unlike the first application example. In other words, the coin handling apparatus 2 is not in cooperation with the external apparatus.

The coin handling apparatus 2, as in the case of the first application example, is installed in a check-out counter and is communicably connected to a POS register or a self-check-out register. The coin handling apparatus 2 is used for settlement between a shop and a customer. The control unit 31 of the coin handling apparatus 2 controls the overall coin handling apparatus 2 such that change fund manually loaded into the cassette 32 by a clerk is received from the cassette 32 and proceeds from sales are passed to the cassette 32.

The memory unit 323 of the cassette 32 is capable of storing cooperation information that means that the coin handling apparatus 2 is not in cooperation with the external apparatus. Alternatively, the memory unit 323 of the cassette 32 may be caused not to store cooperation information. When cooperation information is stored in the memory unit 323 of the cassette 32, the control unit 31 determines a destination of transport of coins in a case where the coin handling apparatus 2 performs predetermined handling based on the cooperation information. A destination of transport that is determined based on cooperation information in the second application example is the place other than the cassette 32. The fact that a destination of transport is the place other than the cassette 32 means that the coin handling apparatus 2 is not in cooperation with the external apparatus. The place other than the cassette 32 is preferably outside the coin handling apparatus 2. The withdrawal unit 22 may be illustrated as the place other than the cassette 32. When the coin handling apparatus 2 includes an out-of-control storage unit for storing money of which the inventory amount is not managed, the out-of-control storage unit may be the place other than the cassette 32. Recording of cooperation information to the memory unit 323, for example, may be performed by the coin handling apparatus 2 or may be performed by an apparatus at a source of shipment at the time of shipment of the cassette 32.

The memory unit 323 has not stored inventory amount information of the cassette 32. The fact that the memory unit 323 has not stored inventory amount information of the cassette 32 means that the coin handling apparatus 2 is not in cooperation with the external apparatus.

Operation Examples in First Application Example

Figure 5A:
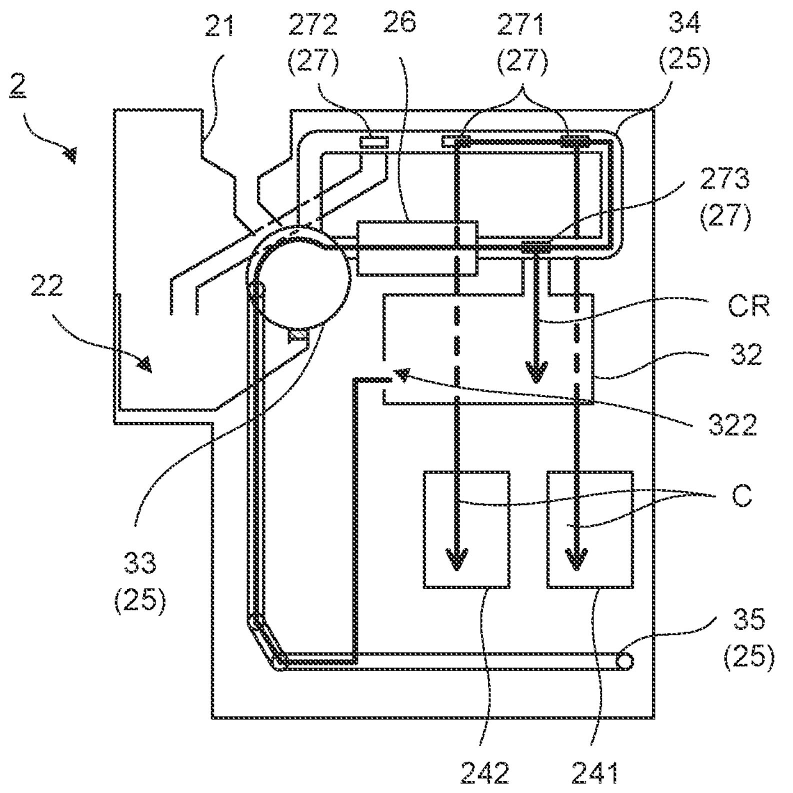
FIG. 5A is a schematic diagram of a first operation example in the first application example of Embodiment 2.
Figure 5B:
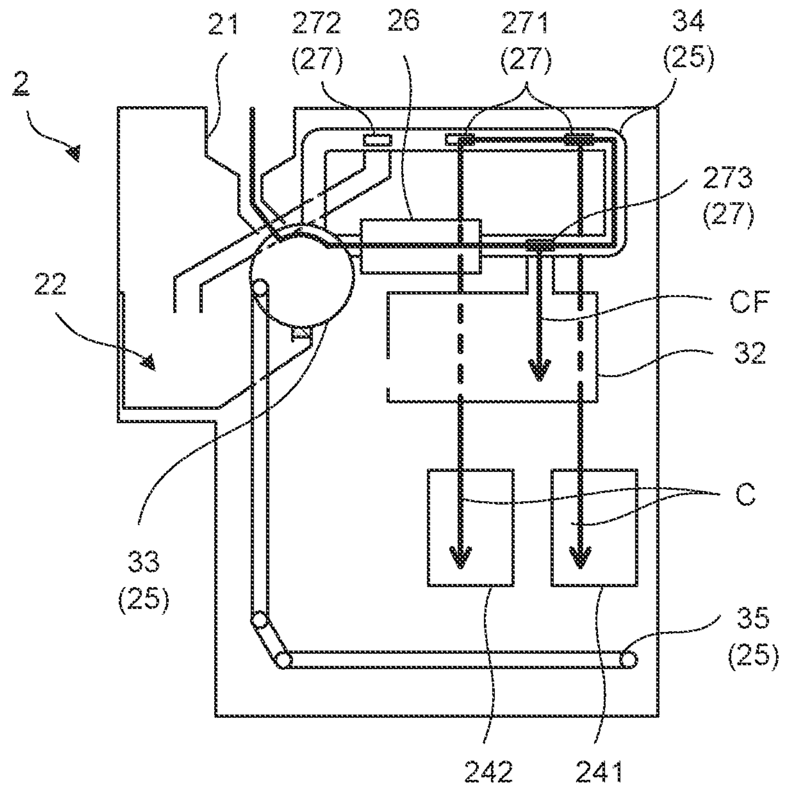
FIG. 5B is a schematic diagram of a second operation example in the first application example of Embodiment 2.
Figure 5C:
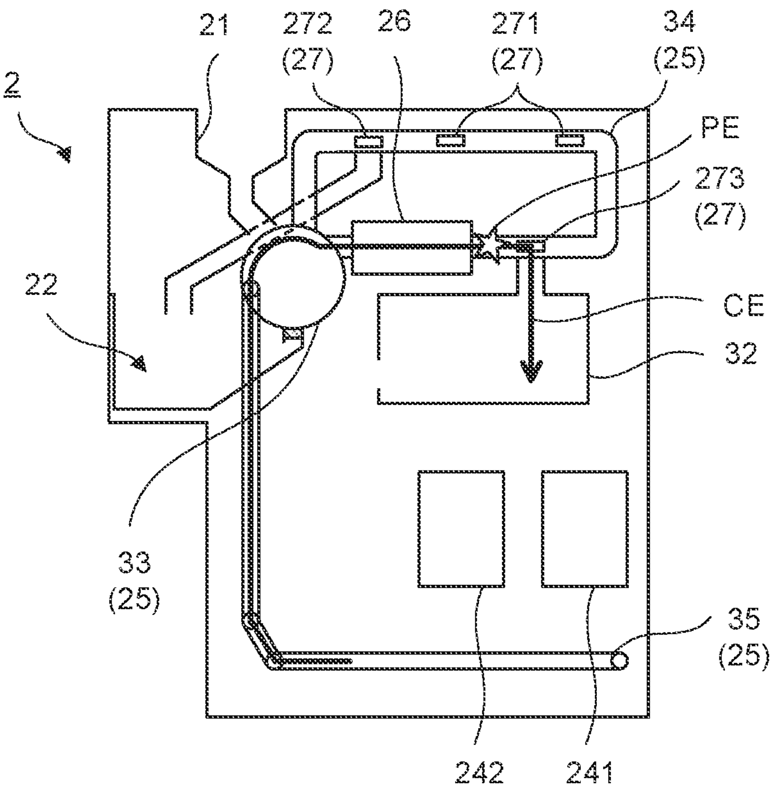
FIG. 5C is a schematic diagram of a third operation example in the first application example of Embodiment 2.

Next, operation examples in the first application example will be described. FIG. 5A is a schematic diagram of a first operation example in the first application example. FIG. 5B is a schematic diagram of a second operation example in the first application example. FIG. 5C is a schematic diagram of a third operation example in the first application example.

(1-1) Selection of Destination of Transport of Coins in Predetermined Handling

Initially, selection of a destination of transport of coins in predetermined handling in a case where the coin handling apparatus 2 and the external apparatus are in cooperation with each other will be described. Predetermined handling in the first application example and a second application example (described later) of Embodiment 2 includes transporting of rejected coins in refilling change fund, transporting of overflow coins in deposit, and transporting of coins transported by the transport unit 25 at the time of occurrence of an error in recovery of the error.

The control unit 31 of the coin handling apparatus 2 determines a cooperation status between the coin handling apparatus 2 and the external apparatus. Then, when the control unit 31 determines that the coin handling apparatus 2 is in cooperation with the external apparatus, the control unit 31 selects the cassette 32 as a destination of transport of coins in predetermined handling.

The control unit 31 may determine a cooperation status between the coin handling apparatus 2 and the external apparatus based on information set by using the operation display unit 28 as described below. For example, a clerk operates the operation display unit 28 to set a cooperation status between the coin handling apparatus 2 and the external apparatus. The set cooperation status is stored in the memory 30 as cooperation information. The control unit 31 reads the cooperation information stored in the memory 30 and determines a cooperation status.

The control unit 31 may determine a cooperation status between the coin handling apparatus 2 and the external apparatus based on information stored in the memory unit 323 of the cassette 32 as described below. When, for example, the cassette 32 is attached to the attachment unit 23 of the coin handling apparatus 2, the control unit 31 determines whether inventory amount information of the cassette 32 or cooperation information that means that the coin handling apparatus 2 is in cooperation with the external apparatus is stored in the memory unit 323. Then, when the inventory amount information or the cooperation information is stored in the memory unit 323 of the cassette 32, the control unit 31 determines that the coin handling apparatus 2 is in cooperation with the external apparatus.

The control unit 31 may determine a cooperation status between the coin handling apparatus 2 and the external apparatus based on information acquired from an outside source as described below. For example, after the cassette 32 is attached to the attachment unit 23 of the coin handling apparatus 2 or before the cassette 32 is attached to the attachment unit 23, the control unit 31 determines whether inventory amount information of the cassette 32 or cooperation information that means that the coin handling apparatus 2 is in cooperation with the external apparatus can be acquired from the back-side coin handling apparatus 41 or the coin management apparatus 42 via the communication unit 29. Then, when the control unit 31 succeeds in acquiring the inventory amount information or the cooperation information from the back-side coin handling apparatus 41 or the coin management apparatus 42, the control unit 31 determines that the cassette 32 is in cooperation with the external apparatus.

Determination of a cooperation status between the coin handling apparatus 2 and the external apparatus may be performed each time before predetermined handling is performed. A clerk may operate the operation display unit 28 to set a destination of transport (in the first application example, a destination of transport is the cassette 32) corresponding to a cooperation status, and the control unit 31 may select a destination of transport of coins based on the setting of the clerk. In this case, the operation display unit 28 functions as the setting unit according to the present disclosure.

(1-2) Refilling of Change Fund (First Operation Example)

Next, refilling of change fund in a case where the coin handling apparatus 2 and the external apparatus are in cooperation with each other (first operation example) will be described. A clerk attaches the cassette 32 to a cassette attachment apparatus of the back-side coin handling apparatus 41. The back-side coin handling apparatus 41 loads the cassette 32 with coins of a predetermined amount as change fund based on operation to an operation unit of the back-side coin handling apparatus 41 by the clerk. The back-side coin handling apparatus 41 may cause the memory unit 323 of the cassette 32 or the back-side coin handling apparatus 41 to store inventory amount information of the cassette 32 or may send the inventory amount information to the coin handling apparatus 2 or the coin management apparatus 42. After that, the clerk attaches the cassette 32 loaded with the change fund to the attachment unit 23 of the coin handling apparatus 2 and operates the operation display unit 28 to instruct the coin handling apparatus 2 to refill the change fund.

When the control unit 31 of the coin handling apparatus 2 receives instructions for refilling change fund, the control unit 31 performs initial refilling for refilling the recycling storage unit 24 with coins stored in the cassette 32 as change fund as shown in FIG. 5A. At the time of performing initial refilling, the control unit 31 initially controls the cassette 32 and the withdrawal transport path 35 such that coins in the cassette 32 are dropped from the discharge outlet 322 and the dropped coins are transported to the hopper 331 of the feed-out unit 33. The control unit 31 controls the feed-out unit 33 and the deposit transport path 34 such that coins in the feed-out unit 33 are transported one by one. The denomination, authenticity, fitness, and the like of coins to be transported by the deposit transport path 34 are recognized by the recognition unit 26. The control unit 31 controls the deposit transport path 34 and the gates of the chutes 27 such that coins C allowed to be used to refill the recycling storage unit 24 are stored in the first denomination-specific storage unit 241 and the second denomination-specific storage unit 242 separately by denomination. On the other hand, the control unit 31 controls the deposit transport path 34, the gates of the chutes 27, and the cassette 32 such that coins not allowed to be used to refill the recycling storage unit 24 are returned to the cassette 32 as rejected coins CR. In other words, the control unit 31 transports the rejected coins CR to the cassette 32 selected based on the fact that the coin handling apparatus 2 is in cooperation with the external apparatus.

The control unit 31 updates the inventory amounts of the cassette 32, the first denomination-specific storage unit 241, and the second denomination-specific storage unit 242, stored in the memory 30, with refilling of change fund. The control unit 31 may send information indicating the inventory amounts of the cassette 32, the first denomination-specific storage unit 241, and the second denomination-specific storage unit 242 after refilling of change fund, to the coin management apparatus 42. The coin management apparatus 42 manages the inventory amounts of the cassette 32, the first denomination-specific storage unit 241, and the second denomination-specific storage unit 242 based on the information acquired from the control unit 31.

(1-3) Deposit (Second Operation Example)

Next, deposit (second operation example) in a case where the coin handling apparatus 2 and the external apparatus are in cooperation with each other will be described. When the control unit 31 performs deposit at the time of settlement of goods as shown in FIG. 5B, the control unit 31, for example, controls the feed-out unit 33 and the deposit transport path 34 such that coins received from the deposit unit 21 and dropped to the feed-out unit 33 are fed out and transported one by one. The denomination, authenticity, fitness, and the like of coins to be transported by the deposit transport path 34 are recognized by the recognition unit 26. The control unit 31 controls the deposit transport path 34 and the gates of the chutes 27 such that coins not allowed to be deposited are discharged from the withdrawal unit 22 as rejected coins. The control unit 31 controls the deposit transport path 34 and the gates of the chutes 27 such that coins C allowed to be deposited are stored in the first denomination-specific storage unit 241 and the second denomination-specific storage unit 242 separately by denomination. When the first denomination-specific storage unit 241 and the second denomination-specific storage unit 242 are full, the control unit 31 controls the deposit transport path 34 and the gates of the chutes 27 such that overflow coins CF are stored in the cassette 32. In other words, the control unit 31 transports the overflow coins CF to the cassette 32 selected based on the fact that the coin handling apparatus 2 is in cooperation with the external apparatus.

The control unit 31 updates the inventory amounts of the cassette 32, the first denomination-specific storage unit 241, and the second denomination-specific storage unit 242, stored in the memory 30, with deposit. The control unit 31 may send information indicating the inventory amounts of the cassette 32, the first denomination-specific storage unit 241, and the second denomination-specific storage unit 242 after deposit to the coin management apparatus 42. The coin management apparatus 42 manages the inventory amounts of the cassette 32, the first denomination-specific storage unit 241, and the second denomination-specific storage unit 242 based on the information acquired from the control unit 31.

(1-4) Recovery of Error (Third Operation Example)

Next, recovery of an error in a case where the coin handling apparatus 2 and the external apparatus are in cooperation with each other (third operation example) will be described. Here, recovery of an error that occurs at the time of refilling of change fund will be described. When there occurs an error, such as a jam (a jam of coins) at an error point PE, for example, as shown in FIG. 5C at the time of refilling of change fund from the cassette 32, the control unit 31 controls the cassette 32 and the transport unit 25 such that drop of coins from the cassette 32 and transport of coins by the transport unit 25 are stopped. Then, after the error is resolved by clerk's work, the control unit 31 controls the transport unit 25 and the gates of the chutes 27 such that the transport unit 25 stores coins CE being transported are stored in the cassette 32. In other words, the control unit 31 transports the coins CE being transported by the transport unit 25 to the cassette 32 selected based on the fact that the coin handling apparatus 2 is in cooperation with the external apparatus.

The control unit 31 updates the inventory amounts of the cassette 32, the first denomination-specific storage unit 241, and the second denomination-specific storage unit 242, stored in the memory 30, with transport of coins CE to the cassette 32. The control unit 31 may send information indicating the inventory amounts of the cassette 32, the first denomination-specific storage unit 241, and the second denomination-specific storage unit 242 after transport of all the coins CE, to the coin management apparatus 42. The coin management apparatus 42 manages the inventory amounts of the cassette 32, the first denomination-specific storage unit 241, and the second denomination-specific storage unit 242 based on the information acquired from the control unit 31.

Operation Examples in Second Application Example

Figure 6A:
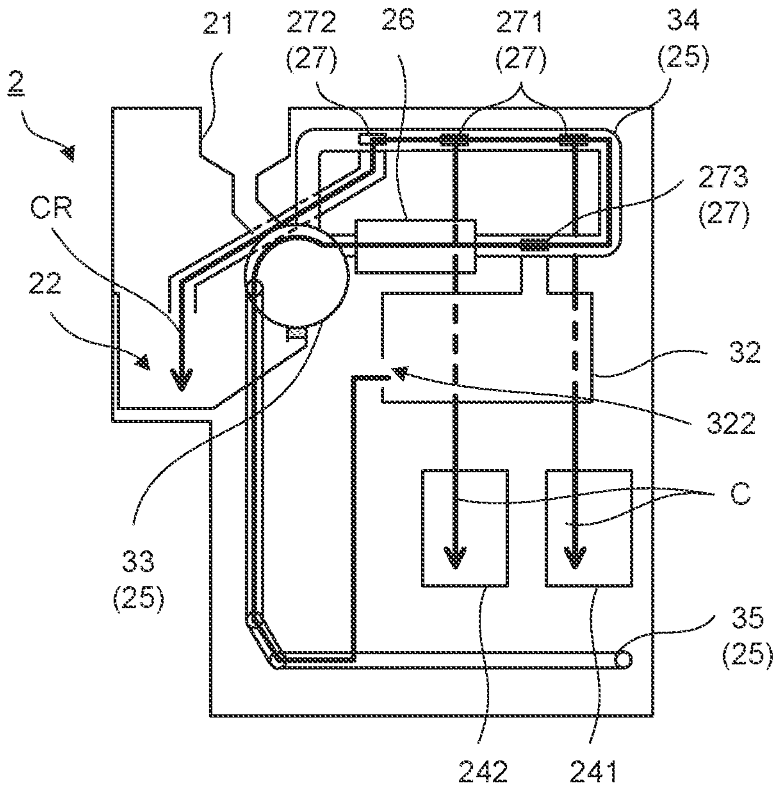
FIG. 6A is a schematic diagram of a first operation example in the second application example of Embodiment 2.
Figure 6B:
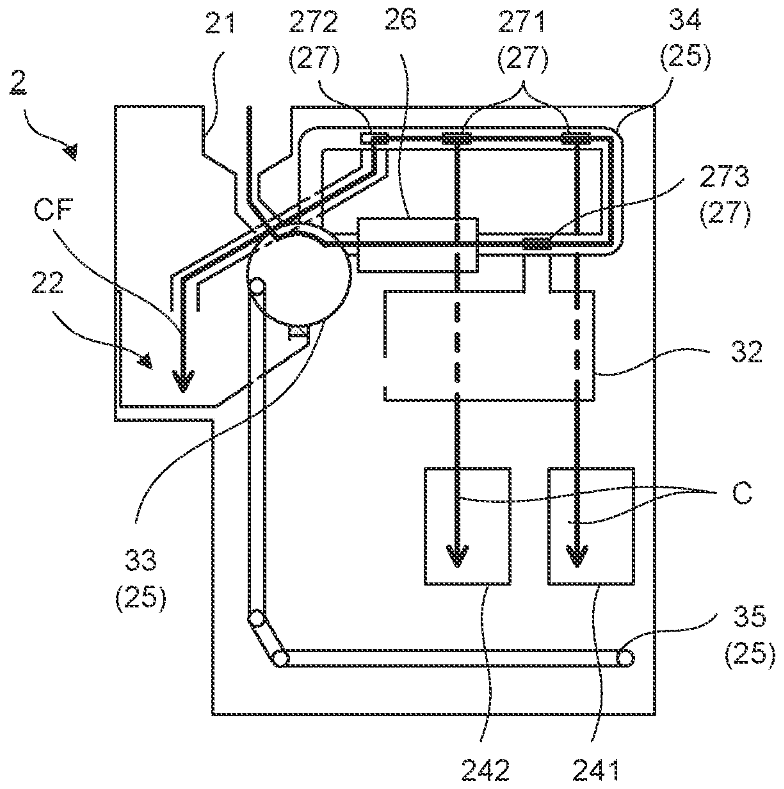
FIG. 6B is a schematic diagram of a second operation example in the second application example of Embodiment 2.
Figure 6C:
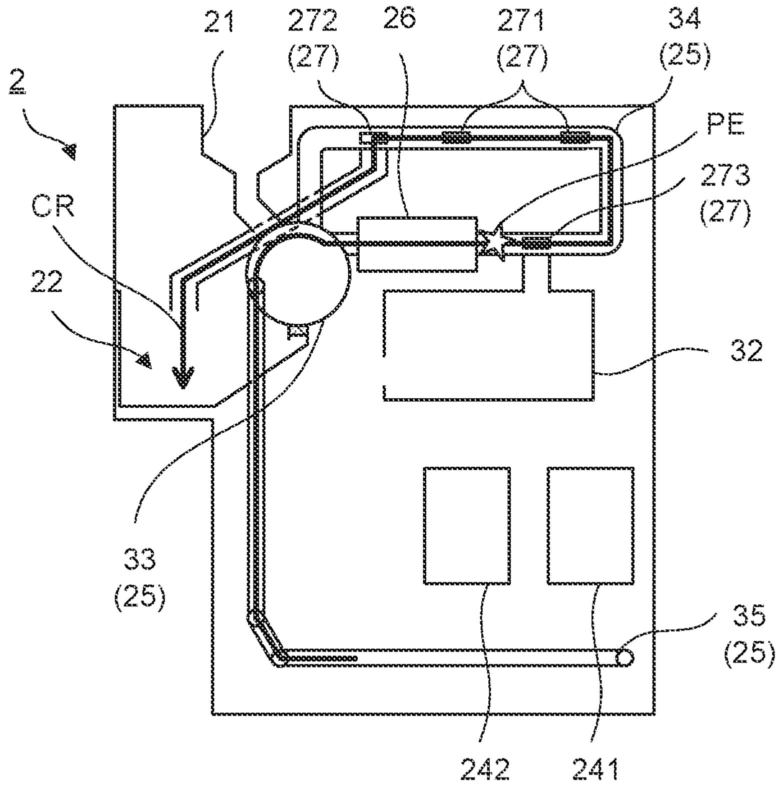
FIG. 6C is a schematic diagram of a third operation example in the second application example of Embodiment 2.

Next, operation examples in the second application example will be described. FIG. 6A is a schematic diagram of a first operation example in the second application example. FIG. 6B is a schematic diagram of a second operation example in the second application example. FIG. 6C is a schematic diagram of a third operation example in the second application example. In the second application example, handling other than transport of coins in predetermined handling is the same as that of the first application example. Therefore, the description of the same handling as that of the first application example is simplified or omitted.

(2-1) Selection of Destination of Transport of Coins in Predetermined Handling

Initially, selection of a destination of transport in predetermined handling in a case where the coin handling apparatus 2 and the external apparatus are not in cooperation with each other will be described. The control unit 31 of the coin handling apparatus 2 determines a cooperation status between the coin handling apparatus 2 and the external apparatus. When the cassette 32 is attached to the attachment unit 23 of the coin handling apparatus 2, the control unit 31 determines whether cooperation information that means that the coin handling apparatus 2 is not in cooperation with the external apparatus is stored in the memory unit 323. Then, when cooperation information that means that the coin handling apparatus 2 is not in cooperation with the external apparatus is stored in the memory unit 323 of the cassette 32 or when cooperation information or inventory amount information is not stored in the memory unit 323, the control unit 31 determines that the coin handling apparatus 2 is not in cooperation with the external apparatus. When the control unit 31 determines that the coin handling apparatus 2 is not in cooperation with the external apparatus, a place (in the second application example, the withdrawal unit 22) other than the cassette 32 is selected as a destination of transport of coins in predetermined handling.

Determination of a cooperation status between the coin handling apparatus 2 and the external apparatus may be performed each time before predetermined handling is performed. A clerk may operate the operation display unit 28 to set a destination of transport of coins (in the second application example, a destination of transport is the withdrawal unit 22) corresponding to a cooperation status between the coin handling apparatus 2 and the external apparatus, and the control unit 31 may select a destination of transport of coins based on the setting of the clerk. In this case, the operation display unit 28 functions as the setting unit according to the present disclosure.

(2-2) Refilling of Change Fund (First Operation Example)

Next, refilling of change fund in a case where the coin handling apparatus 2 and the external apparatus are not in cooperation with each other (first operation example) will be described. A clerk manually loads the cassette 32 with coins of a predetermined amount as change fund. After that, the clerk attaches the cassette 32 loaded with the change fund to the attachment unit 23 of the coin handling apparatus 2 and operates the operation display unit 28 to instruct the coin handling apparatus 2 to refill the change fund.

When the control unit 31 of the coin handling apparatus 2 receives instructions for refilling change fund, the control unit 31 performs initial refilling as shown in FIG. 6A. In initial refilling, the control unit 31 controls the deposit transport path 34 and the gates of the chutes 27 such that coins C allowed to be used to refill the recycling storage unit 24 are stored in the first denomination-specific storage unit 241 and the second denomination-specific storage unit 242 separately by denomination. On the other hand, the control unit 31 controls the deposit transport path 34 and the gates of the chutes 27 such that rejected coins CR are transported to the withdrawal unit 22. In other words, the control unit 31 transports rejected coins CR to the place other than the cassette 32, selected based on the fact that the coin handling apparatus 2 is not in cooperation with the external apparatus.

The control unit 31 updates the inventory amounts of the first denomination-specific storage unit 241 and the second denomination-specific storage unit 242, stored in the memory 30, with refilling of change fund. The inventory amount of the cassette 32 is not recorded on the memory 30. In other words, the control unit 31 does not manage the inventory amount of the cassette 32.

(2-3) Deposit (Second Operation Example)

Next, deposit (second operation example) in a case where the coin handling apparatus 2 and the external apparatus are not in cooperation with each other will be described. In deposit shown in FIG. 6B, the control unit 31 controls the deposit transport path 34 and the gates of the chutes 27 such that coins not allowed to be deposited are discharged from the withdrawal unit 22 as rejected coins. The control unit 31 controls the deposit transport path 34 and the gates of the chutes 27 such that coins C allowed to be deposited are stored in the first denomination-specific storage unit 241 and the second denomination-specific storage unit 242 separately by denomination. The control unit 31 controls the deposit transport path 34 and the gates of the chutes 27 such that overflow coins CF are transported to the withdrawal unit 22. In other words, the control unit 31 transports overflow coins CF to the place other than the cassette 32, selected based on the fact that the coin handling apparatus 2 is not in cooperation with the external apparatus.

The control unit 31 updates the inventory amounts of the first denomination-specific storage unit 241 and the second denomination-specific storage unit 242, stored in the memory 30, with deposit and does not manage the inventory amount of the cassette 32.

(2-4) Recovery of Error (Third Operation Example)

Next, recovery of an error in a case where the coin handling apparatus 2 and the external apparatus are not in cooperation with each other (third operation example) will be described. When there occurs an error at an error point PE, for example, as shown in FIG. 6C at the time of refilling of change fund from the cassette 32, the control unit 31 stops drop of coins from the cassette 32 and transport of coins by the transport unit 25. Then, after the error is resolved by clerk's work, the control unit 31 controls the transport unit 25 and the gates of the chutes 27 such that the transport unit 25 transports coins CE being transported to the withdrawal unit 22. In other words, the control unit 31 transports coins CE being transported by the transport unit 25 to the place other than the cassette 32, selected based on the fact that the coin handling apparatus 2 is not in cooperation with the external apparatus.

The control unit 31 updates the inventory amounts of the first denomination-specific storage unit 241 and the second denomination-specific storage unit 242, stored in the memory 30, with transport of coins CE to the place other than the cassette 32 and does not manage the inventory amount of the cassette 32.

Advantageous Effects of Embodiment 2

According to Embodiment 2, when there is cooperation between the coin handling apparatus 2 and the external apparatus, the coin handling apparatus 2 transports coins to the cassette 32. When the coin handling apparatus 2 and the external apparatus are in cooperation with each other, the coin handling apparatus 2 is capable of acquiring the inventory amount of the cassette 32 from the external apparatus when the cassette 32 is attached to the coin handling apparatus 2. Thus, even when coins are transported to the cassette 32, it is possible to continuously manage the inventory amount of coins in the cassette 32. On the other hand, when there is no cooperation between the coin handling apparatus 2 and the external apparatus, the coin handling apparatus 2 does not transport coins to the cassette 32 but transports coins to a place (withdrawal unit 22) other than the cassette 32. When the coin handling apparatus 2 and the external apparatus are not in cooperation with each other, the coin handling apparatus 2 is not capable of acquiring the inventory amount of the cassette 32 from the external apparatus when the cassette 32 is attached to the coin handling apparatus 2. Thus, it is possible to prevent occurrence of an inconvenience that coins of which the inventory amount is not managed and coins of which the inventory amount is managed are mixedly stored in the cassette 32 when coins are transported to the place other than the cassette 32. Therefore, the coin handling apparatus 2 is capable of appropriately performing operation on handling of coins depending on presence or absence of cooperation between the coin handling apparatus 2 and the external apparatus.

Variation of Embodiment 2

A case where a clerk manually loads the cassette 32 with change fund while a shop is open in the first application example of Embodiment 2 in which the coin handling apparatus 2 is in cooperation with the external apparatus will be described. In the case of manual loading, ordinarily, the coin handling system 4 is operated in a situation in which the coin handling apparatus 2 is not in cooperation with the external apparatus; however, the coin handling system 4 may be configured to perform handling as follows.

Initially, a clerk removes the cassette 32 from the coin handling apparatus 2. Then, the clerk manually loads the cassette 32 with change fund and attaches the cassette 32 to the coin handling apparatus 2.

After that, the clerk may operate the operation display unit 28 of the coin handling apparatus 2 or the coin management apparatus 42 such that the amount of coins manually loaded is incorporated into the inventory amount of the cassette 32, managed by the coin management apparatus 42. In this case, a state is equivalent to a state where the coin management apparatus 42 is capable of accurately managing the inventory amount of the cassette 32, that is, a state where the coin handling apparatus 2 is in cooperation with the external apparatus. Therefore, in predetermined handling, the control unit 31 is allowed to transport coins to the cassette 32. Then, in predetermined handling performed thereafter, coins are transported to the cassette 32, and, as in the case of the first application example of Embodiment 2, the inventory amounts of the cassette 32, the first denomination-specific storage unit 241, and the second denomination-specific storage unit 242 are managed by the coin handling apparatus 2 and the coin management apparatus 42.

On the other hand, the clerk does not need to perform operation such that the amount of coins manually loaded is incorporated into the inventory amount of the cassette 32, managed by the coin management apparatus 42. In this case, a state is equivalent to a state where the coin management apparatus 42 is not capable of accurately managing the inventory amount of the cassette 32, that is, a state where the coin handling apparatus 2 is not in cooperation with the external apparatus. Therefore, the control unit 31 changes a destination of transport of coins in predetermined handling from the cassette 32 to the withdrawal unit 22 (the place other than the cassette 32).

After that, for example, until coins in the cassette 32 run out as a result of refilling the recycling storage unit 24 with change fund, a state where the control unit 31 transports coins to the withdrawal unit 22 is maintained in predetermined handling. The control unit 31 updates the inventory amounts of the first denomination-specific storage unit 241 and the second denomination-specific storage unit 242, stored in the memory 30, and interrupts update of the inventory amount of the cassette 32. The control unit 31 sends only information indicating the inventory amounts of the first denomination-specific storage unit 241 and the second denomination-specific storage unit 242 to the coin management apparatus 42. The coin management apparatus 42 manages the inventory amounts of the first denomination-specific storage unit 241 and the second denomination-specific storage unit 242 and interrupts management of the inventory amount of the cassette 32, based on the information acquired through such sending control of the control unit 31.

Then, when coins in the cassette 32 become empty as a result of, for example, refilling of change fund to the recycling storage unit 24, the control unit 31 can confirm that the inventory amount of the cassette 32 is zero. Thus, a state is equivalent to a state where it is possible to accurately manage the inventory amount of coins to be stored in the cassette 32 thereafter, that is, a state where it is possible to establish cooperation between the coin handling apparatus 2 and the external apparatus. Therefore, the control unit 31 changes a destination of transport of coins in predetermined handling from the withdrawal unit 22 (a destination of transport other than the cassette 32) to the cassette 32. Then, in predetermined handling, such as deposit, to be performed thereafter, the control unit 31 transports coins to the cassette 32 in predetermined handling. The control unit 31 updates the inventory amounts of the first denomination-specific storage unit 241 and the second denomination-specific storage unit 242, stored in the memory 30, and resumes update of the inventory amount of the cassette 32. The control unit 31 sends information indicating the inventory amounts of the cassette 32, the first denomination-specific storage unit 241, and the second denomination-specific storage unit 242 to the coin management apparatus 42. The coin management apparatus 42 manages the inventory amounts of the first denomination-specific storage unit 241 and the second denomination-specific storage unit 242 and resumes management of the inventory amount of the cassette 32, based on the information acquired through such sending control of the control unit 31.

Embodiment 3

Next, Embodiment 3 will be described with reference to the attached drawings. In Embodiment 3, a banknote handling apparatus that is an example of the money handling apparatus will be described.

Configuration of Banknote Handling Apparatus

Figure 7:
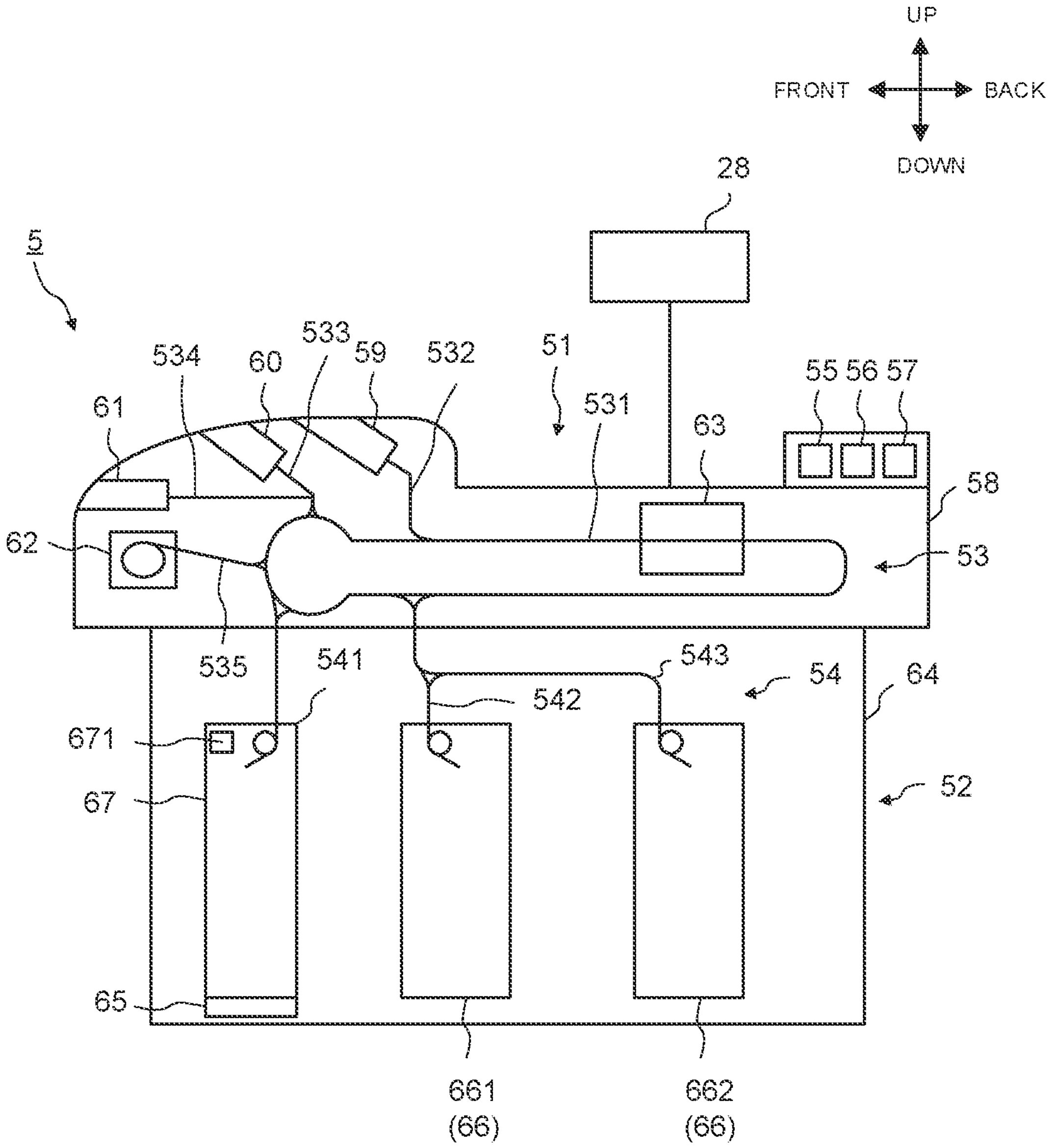
FIG. 7 is a schematic diagram of the internal configuration of the banknote handling apparatus according to Embodiment 3.

Initially, the configuration of the banknote handling apparatus will be described. FIG. 7 is a schematic diagram of the internal configuration of the banknote handling apparatus. In the following description, a front side is a side to which a clerk or a customer of a shop in which the banknote handling apparatus is installed faces, and a back side is a side opposite to the front side. A right-hand side is a right-hand side when viewed from the clerk or the customer, and a left-hand side is a side opposite to the right-hand side. An upper side is an upper side when the banknote handling apparatus installed on a horizontal plane, and a lower side is a side opposite to the upper side.

The banknote handling apparatus 5 shown in FIG. 7 performs handling on banknotes that are an example of money. For example, deposit, withdrawal, refilling, and collection can be illustrated as handling on banknotes. The banknote handling apparatus 5 includes an upper-part handling unit 51, a lower-part safe unit 52, an upper transport unit 53, a lower transport unit 54, the operation display unit 28, a memory 56, and a control unit 57. The banknote handling apparatus 5 may include a communication unit 55. The handling unit 51 includes an upper-part casing 58. A deposit unit 59, a withdrawal unit 60, and a recognition unit 63 are disposed in the upper-part casing 58. A rejecting unit 61 and a temporary storage unit 62 may be disposed in the upper-part casing 58.

The deposit unit 59 is configured to be capable of depositing banknotes into the banknote handling apparatus 5. The withdrawal unit 60 is configured to be capable of withdrawing banknotes from the banknote handling apparatus 5. The withdrawal unit 60 may be configured to be capable of discharging banknotes not allowed to be deposited, as rejected banknotes. When the banknote handling apparatus 5 includes the rejecting unit 61, rejected banknotes may be discharged to the rejecting unit 61.

When the banknote handling apparatus 5 includes the temporary storage unit 62, banknotes intended for deposit are temporarily stored in the temporary storage unit 62, for example, at the time of deposit. The temporary storage unit 62 is capable of feeding out the stored banknotes. The temporary storage unit 62 is a tape-type storage unit. The temporary storage unit 62 stores banknotes by taking up banknotes with a drum together with a tape.

The recognition unit 63 is disposed in a first transport path 531 (described later). The recognition unit 63 recognizes, for example, the denomination, authenticity, fitness, and the like of money to be transported by the first transport path 531.

The safe unit 52 is configured to include a safe casing 64, an attachment unit 65, and a recycling storage unit 66.

The attachment unit 65 is, for example, provided at a front part inside the safe casing 64. A cassette 67 is detachably attached to the attachment unit 65. The cassette 67 includes a transport mechanism and an open-close door. The cassette 67 may include a memory unit 671. The transport mechanism is configured to be capable of recycling banknotes by feeding banknotes from the outside of the cassette 67 to the inside of the cassette 67 and feeding banknotes from the inside of the cassette 67 to the outside of the cassette 67. The open-close door is configured so that a clerk is able to manually load the cassette 67 with banknotes by opening the open-close door. The attachment unit 65 may be provided at a front part or a back part outside the safe casing 64.

The recycling storage unit 66 is an example of the storage unit according to the present disclosure. The recycling storage unit 66 may be a mixed storage unit for storing banknotes of a plurality of denominations in a mixed state. The mixed storage unit, as in the case of the cassette 67, includes a transport mechanism that feeds in and out banknotes to and from the mixed storage unit. The recycling storage unit 66 may include a plurality of (two in Embodiment 3) denomination-specific storage units 661, 662 (hereinafter, which may be referred to as the first denomination-specific storage unit 661 and the second denomination-specific storage unit 662). The first denomination-specific storage unit 661 and the second denomination-specific storage unit 662, as in the case of the cassette 67, include a transport mechanism that feeds in and out banknotes to and from the first denomination-specific storage unit 661 and the second denomination-specific storage unit 662. A denomination of banknotes stored in the first denomination-specific storage unit 661 and a denomination of banknotes stored in the second denomination-specific storage unit 662 are set in advance.

The upper transport unit 53 and the lower transport unit 54 separate banknotes and transport the banknotes one by one in the banknote handling apparatus 5.

The upper transport unit 53 includes a first transport path 531, a second transport path 532, a third transport path 533, a fourth transport path 534, and a fifth transport path 535.

The first transport path 531 is configured in a loop shape. The first transport path 531 is capable of transporting banknotes in a clockwise direction and in a counter-clockwise direction in FIG. 7. The second transport path 532 connects the deposit unit 59 with the first transport path 531 and transports banknotes from the deposit unit 59 toward the first transport path 531. The third transport path 533 connects the withdrawal unit 60 with the first transport path 531 and transports banknotes from the first transport path 531 toward the withdrawal unit 60. The fourth transport path 534 connects the rejecting unit 61 with the first transport path 531 and transports banknotes from the first transport path 531 toward the rejecting unit 61. The fifth transport path 535 connects the temporary storage unit 62 with the first transport path 531. The fifth transport path 535 transports banknotes from the first transport path 531 toward the temporary storage unit 62 and also transports banknotes from the temporary storage unit 62 toward the first transport path 531.

The lower transport unit 54 includes a sixth transport path 541, a seventh transport path 542, and an eighth transport path 543.

The sixth transport path 541 connects the cassette 67 attached to the attachment unit 65 with the first transport path 531. The sixth transport path 541 transports banknotes from the first transport path 531 toward the cassette 67 and also transports banknotes from the cassette 67 toward the first transport path 531. The seventh transport path 542 connects the first denomination-specific storage unit 661 with the first transport path 531. The seventh transport path 542 transports banknotes from the first transport path 531 toward the first denomination-specific storage unit 661 and also transports banknotes from the first denomination-specific storage unit 661 toward the first transport path 531. The eighth transport path 543 connects the second denomination-specific storage unit 662 with the seventh transport path 542. The eighth transport path 543 transports banknotes from the seventh transport path 542 toward the second denomination-specific storage unit 662 and also transports banknotes from the second denomination-specific storage unit 662 toward the first transport path 531 via the seventh transport path 542.

The communication unit 55 communicates with the external apparatus. The memory 56 is capable of storing various pieces of information. For example, the inventory amounts of the cassette 67, the first denomination-specific storage unit 661, and the second denomination-specific storage unit 662 may be illustrated as information to be stored in the memory 56.

The control unit 57 controls the overall operation of the banknote handling apparatus 5. As will be described in detail later, at the time of performing predetermined handling on banknotes, the control unit 57 controls the upper transport unit 53 and the lower transport unit 54 such that banknotes are transported to the cassette 67 or a place other than the cassette 67, based on a cooperation status between the banknote handling apparatus 5 and the external apparatus.

Application Examples of Banknote Handling Apparatus

Next, application examples of the banknote handling apparatus 5 will be described with reference to FIGS. 4A and 4B.

Configuration of First Application Example

Initially, the configuration of the first application example will be described. As shown in FIG. 4A, in the first application example, the banknote handling apparatus 5 is applied to a banknote handling system 7. The banknote handling system 7 is installed in a shop. The banknote handling system 7 includes the banknote handling apparatus 5, a back-side banknote handling apparatus 71, and the cassette 67. The banknote handling system 7 may include a banknote management apparatus 72. Furthermore, the banknote handling system 7 may include the POS management apparatus 43. As will be described later, inventory amount information indicating the inventory amount of the cassette 67 is stored (managed) in at least one of the back-side banknote handling apparatus 71 and the banknote management apparatus 72 that are examples of the external apparatus. In Embodiment 3, as in the case of the first application example, a situation in which the inventory amount of the cassette 67 is managed by the banknote handling apparatus 5 and the external apparatus means a situation in which the banknote handling apparatus 5 and the external apparatus are in cooperation with each other.

The banknote handling apparatus 5 is installed in a check-out counter and is communicably connected to a POS register or a self-check-out register. The banknote handling apparatus 5 is used for settlement between a shop and a customer. The control unit 57 of the banknote handling apparatus 5 controls the overall banknote handling apparatus 5 such that change fund prepared in the back-side banknote handling apparatus 71 is received from the cassette 67 and proceeds from sales are passed to the cassette 67.

The cassette 67 is configured to be allowed to be detachably attached to the banknote handling apparatus 5 or the back-side banknote handling apparatus 71. The memory unit 671 of the cassette 67 is capable of storing cooperation information that means that the banknote handling apparatus 5 is in cooperation with the external apparatus (the back-side banknote handling apparatus 71 or the banknote management apparatus 72). Cooperation information may be associated with information indicating a destination of transport of banknotes in a case where the banknote handling apparatus 5 performs predetermined handling. A destination of transport corresponding to cooperation information in the first application example is the cassette 67. The fact that a destination of transport corresponding to cooperation information is the cassette 67 means that the banknote handling apparatus 5 is in cooperation with the external apparatus. Recording of cooperation information to the memory unit 671, for example, may be performed by the back-side banknote handling apparatus 71 or the banknote handling apparatus 5 or may be performed by an apparatus at a source of shipment at the time of shipment of the cassette 67.

The memory unit 671 is capable of storing inventory amount information of the cassette 67. The fact that the memory unit 671 stores inventory amount information of the cassette 67 means that the banknote handling apparatus 5 is in cooperation with the external apparatus. In other words, inventory amount information can function as cooperation information. Recording of inventory amount information to the memory unit 671 is performed by, for example, the back-side banknote handling apparatus 71.

The back-side banknote handling apparatus 71, the banknote management apparatus 72, and the POS management apparatus 43 are installed in the back office of a shop and are communicably connected to the banknote handling apparatus 5. The back-side banknote handling apparatus 71 includes a cassette attachment apparatus to which the cassette 67 is attached. The back-side banknote handling apparatus 71 withdraws change fund for loading the banknote handling apparatus 5 to the cassette 67 or proceeds from sales collected from the banknote handling apparatus 5 are received from the cassette 67.

The back-side banknote handling apparatus 71 is capable of storing inventory amount information of the cassette 67 at the time when change fund is withdrawn to the cassette 67. The back-side banknote handling apparatus 71 is capable of storing inventory amount information of the cassette 67 in the memory unit 671 of the cassette 67 or sending the inventory amount information to the banknote handling apparatus 5 or the banknote management apparatus 72. The back-side banknote handling apparatus 71 is capable of storing cooperation information in the memory unit 671 of the cassette 67 or sending the cooperation information to the banknote handling apparatus 5.

The banknote management apparatus 72 is communicably connected to the banknote handling apparatus 5 and the back-side banknote handling apparatus 71. The banknote management apparatus 72 manages banknotes (inventory amount) stored in the banknote handling apparatus 5 and the back-side banknote handling apparatus 71. The banknote management apparatus 72 is capable of managing the inventory amount of the cassette 67. The banknote management apparatus 72 is capable of sending inventory amount information of the cassette 67 to the banknote handling apparatus 5.

Configuration of Second Application Example

Next, the configuration of the second application example will be described. As shown in FIG. 4B, in the second application example, the banknote handling apparatus 5 is solely used. In the second application example, the inventory amount of the cassette 67 is not managed by the external apparatus unlike the first application example. In other words, the banknote handling apparatus 5 is not in cooperation with the external apparatus.

The banknote handling apparatus 5, as in the case of the first application example, is installed in a check-out counter and is communicably connected to a POS register or a self-check-out register. The banknote handling apparatus 5 is used for settlement between a shop and a customer. The control unit 57 of the banknote handling apparatus 5 controls the overall banknote handling apparatus 5 such that change fund manually loaded into the cassette 67 by a clerk is received from the cassette 67 and proceeds from sales are passed to the cassette 67.

The memory unit 671 of the cassette 67 is capable of storing cooperation information that means that the banknote handling apparatus 5 is not in cooperation with the external apparatus. Alternatively, the memory unit 671 of the cassette 67 may be caused not to store cooperation information or inventory amount information of the cassette 67. The fact that the memory unit 671 has not stored inventory amount information of the cassette 67 means that the banknote handling apparatus 5 is not in cooperation with the external apparatus. Cooperation information may be associated with information indicating a destination of transport of banknotes in a case where the banknote handling apparatus 5 performs predetermined handling. A destination of transport corresponding to cooperation information in the second application example is the place other than the cassette 67. When cooperation information or inventory amount information is not stored in the memory unit 671 as well, a destination of transport is determined as the place other than the cassette 67. The fact that a destination of transport is the place other than the cassette 67 means that the banknote handling apparatus 5 is not in cooperation with the external apparatus. The place other than the cassette 67 is preferably outside the banknote handling apparatus 5. The withdrawal unit 60 or the rejecting unit 61 may be illustrated as the place other than the cassette 67. When an out-of-control storage unit for storing banknotes of which the inventory amount is not managed is provided, the out-of-control storage unit may be the place other than the cassette 67. Recording of cooperation information to the memory unit 671, for example, may be performed by the banknote handling apparatus 5 or may be performed by an apparatus at a source of shipment at the time of shipment of the cassette 67.

Operation Example in First Application Example

Next, an operation example in the first application example will be described.

(3-1) Selection of Destination of Transport of Banknotes in Predetermined Handling Initially, selection of a destination of transport of banknotes in predetermined handling in a case where the banknote handling apparatus 5 and the external apparatus are in cooperation with each other will be described. Predetermined handling in the first application example and the second application example (described later) of Embodiment 3 includes transporting of rejected banknotes in refilling change fund. As will be described later, the control unit 57 transports overflow banknotes in deposit to the cassette 67. As in the case of the first application example of Embodiment 2, in transport of overflow banknotes in deposit as predetermined handling, the control unit 57 may transport overflow banknotes to the cassette 67. In transport of banknotes being transported by the upper transport unit 53 or the lower transport unit 54 at the time of occurrence of an error in recovery of the error, the control unit 57 may transport banknotes being transported by the upper transport unit 53 or the lower transport unit 54 to the cassette 67.

The control unit 57 of the banknote handling apparatus 5 determines a cooperation status between the banknote handling apparatus 5 and the external apparatus through similar handling to that of the control unit 31 according to Embodiment 2. When inventory amount information of the cassette 67 or cooperation information that means that the banknote handling apparatus 5 is in cooperation with the external apparatus is stored in the memory unit 671 of the cassette 67 attached to the attachment unit 65, the control unit 57 may determine that the banknote handling apparatus 5 is in cooperation with the external apparatus. When the control unit 57 is allowed to acquire, from the back-side banknote handling apparatus 71 or the banknote management apparatus 72, inventory amount information of the cassette 67 or cooperation information that means that the banknote handling apparatus 5 is in cooperation with the external apparatus, after the cassette 67 is attached to the attachment unit 65 of the banknote handling apparatus 5 or before the cassette 67 is attached to the attachment unit 65, it may be determined that the banknote handling apparatus 5 may be determined as being in cooperation with the external apparatus. When the control unit 57 determines that the banknote handling apparatus 5 is in cooperation with the external apparatus, the control unit 57 selects the cassette 67 as a destination of transport of banknotes in predetermined handling.

Determination of a cooperation status between the banknote handling apparatus 5 and the external apparatus may be performed each time before predetermined handling is performed. A clerk may operate the operation display unit 28 to set a destination of transport of banknotes (in the first application example, a destination of transport is the cassette 67) corresponding to a cooperation status between the banknote handling apparatus 5 and the external apparatus, and the control unit 57 may select a destination of transport of banknotes based on the setting of the clerk. In this case, the operation display unit 28 functions as the setting unit according to the present disclosure.

(3-2) Refilling of Change Fund

Next, refilling of change fund in a case where the banknote handling apparatus 5 and the external apparatus are in cooperation with each other will be described. A clerk loads a cassette attachment apparatus of the back-side banknote handling apparatus 71 with the cassette 67 and loads the cassette 67 with banknotes of a predetermined amount as change fund. The back-side banknote handling apparatus 71 may cause the memory unit 671 of the cassette 67 or the back-side banknote handling apparatus 71 to store inventory amount information of the cassette 67 or may send the inventory amount information to the banknote handling apparatus 5 or the banknote management apparatus 72. After that, the clerk attaches the cassette 67 loaded with the change fund to the attachment unit 65 of the banknote handling apparatus 5 and operates the operation display unit 28 to instruct the banknote handling apparatus 5 to refill change fund.

When the control unit 57 of the banknote handling apparatus 5 receives instructions for refilling change fund, the control unit 57 performs initial refilling for refilling the recycling storage unit 66 with banknotes stored in the cassette 67 as change fund. At the time of performing initial refilling, the control unit 57 initially controls the cassette 67, the upper transport unit 53, and the lower transport unit 54 such that banknotes in the cassette 67 are discharged and are transported in a clockwise direction in FIG. 7 by the first transport path 531. The denomination, authenticity, fitness, and the like of banknotes to be transported by the upper transport unit 53 are recognized by the recognition unit 63. The control unit 57 controls the upper transport unit 53, the lower transport unit 54, the first denomination-specific storage unit 661, and the second denomination-specific storage unit 662 such that banknotes allowed to be used to refill the recycling storage unit 66 are stored in the first denomination-specific storage unit 661 and the second denomination-specific storage unit 662 separately by denomination. On the other hand, the control unit 57 controls the upper transport unit 53, the lower transport unit 54, and the cassette 67 such that banknotes not allowed to be used to refill the recycling storage unit 66 are returned to the cassette 67 as rejected banknotes. In other words, the control unit 57 transports the rejected banknotes to the cassette 67 selected based on the fact that the banknote handling apparatus 5 is in cooperation with the external apparatus.

The control unit 57 updates the inventory amounts of the cassette 67, the first denomination-specific storage unit 661, and the second denomination-specific storage unit 662, stored in the memory 56, with refilling of change fund. The control unit 57 sends information indicating the inventory amounts of the cassette 67, the first denomination-specific storage unit 661, and the second denomination-specific storage unit 662 after refilling of change fund, to the banknote management apparatus 72. The banknote management apparatus 72 manages the inventory amounts of the cassette 67, the first denomination-specific storage unit 661, and the second denomination-specific storage unit 662 based on such information acquired through sending control of the control unit 57.

Operation Example in Second Application Example

Next, an operation example in the second application example will be described. In the second application example, handling other than transport of banknotes in predetermined handling is the same as that of the first application example. Therefore, the description of the same handling as that of the first application example is simplified or omitted.

(4-1) Selection of Destination of Transport of Banknotes in Predetermined Handling Initially, selection of a destination of transport of banknotes in predetermined handling in a case where the banknote handling apparatus 5 and the external apparatus are not in cooperation with each other will be described. As will be described later, the control unit 57 transports rejected banknotes in refilling of change fund to the place other than the cassette 67. As in the case of the second application example of Embodiment 2, in transport of overflow banknotes in deposit as predetermined handling, the control unit 57 may transport overflow banknotes to the place other than the cassette 67. In transport of banknotes being transported by the upper transport unit 53 or the lower transport unit 54 at the time of occurrence of an error in recovery of the error, the control unit 57 may transport banknotes being transported by the upper transport unit 53 or the lower transport unit 54 to the place other than the cassette 67.

The control unit 57 of the banknote handling apparatus 5 determines a cooperation status between the banknote handling apparatus 5 and the external apparatus. When cooperation information that means that the banknote handling apparatus 5 is not in cooperation with the external apparatus is stored in the memory unit 671 of the cassette 67 attached to the attachment unit 65, the control unit 57 determines that the cassette 67 is not in cooperation with the external apparatus. When the control unit 57 determines that cooperation information or inventory amount information of the cassette 67 is not stored in the memory unit 671, the control unit 57 may determine that the banknote handling apparatus 5 is not in cooperation with the external apparatus. When the control unit 57 determines that the banknote handling apparatus 5 is not in cooperation with the external apparatus, a place (in the second application example, the withdrawal unit 60) other than the cassette 67 is selected as a destination of transport of banknotes in predetermined handling.

Determination of a cooperation status between the banknote handling apparatus 5 and the external apparatus may be performed each time before predetermined handling is performed. A clerk may operate the operation display unit 28 to set a destination of transport of banknotes (in the second application example, a destination of transport is the withdrawal unit 60) corresponding to a cooperation status between the cassette 67 and the external apparatus, and the control unit 57 may select a destination of transport of banknotes based on the setting of the clerk. In this case, the operation display unit 28 functions as the setting unit according to the present disclosure.

(4-2) Refilling of Change Fund

Next, refilling of change fund in a case where the banknote handling apparatus 5 is not in cooperation with the external apparatus will be described. A clerk manually loads the cassette 67 with banknotes of a predetermined amount as change fund. After that, the clerk attaches the cassette 67 loaded with the change fund to the attachment unit 65 of the banknote handling apparatus 5 and operates the operation display unit 28 to instruct the banknote handling apparatus 5 to refill the change fund.

When the control unit 57 of the banknote handling apparatus 5 receives instructions for refilling change fund, the control unit 57 performs initial refilling. In initial refilling, the control unit 57 controls the upper transport unit 53, the lower transport unit 54, the first denomination-specific storage unit 661, and the second denomination-specific storage unit 662 such that banknotes allowed to be used to refill the recycling storage unit 66 are stored in the first denomination-specific storage unit 661 and the second denomination-specific storage unit 662 separately by denomination. On the other hand, the control unit 57 controls the upper transport unit 53 such that rejected banknotes are transported to the withdrawal unit 60. In other words, the control unit 57 transports rejected banknotes to the place other than the cassette 67, selected based on the fact that the banknote handling apparatus 5 is not in cooperation with the external apparatus.

The control unit 57 updates the inventory amounts of the first denomination-specific storage unit 661 and the second denomination-specific storage unit 662, stored in the memory 56, with refilling of change fund. The inventory amount of the cassette 67 is not recorded on the memory 56. In other words, the control unit 57 does not manage the inventory amount of the cassette 67.

Advantageous Effects of Embodiment 3

According to Embodiment 3, when there is cooperation between the banknote handling apparatus 5 and the external apparatus, the banknote handling apparatus 5 transports banknotes to the cassette 67. In this way, when banknotes are transported to the cassette 67, it is possible to continuously manage the inventory amount of banknotes in the cassette 67. On the other hand, when there is no cooperation between the banknote handling apparatus 5 and the external apparatus, the banknote handling apparatus 5 does not transport banknotes to the cassette 67 but transports banknotes to a place (withdrawal unit 60) other than the cassette 67. In this way, when banknotes are transported to the place other than the cassette 67, it is possible to prevent occurrence of an inconvenience that banknotes of which the inventory amount is managed and banknotes of which the inventory amount in the cassette 67 is not managed are mixedly stored. Therefore, the banknote handling apparatus 5 is capable of appropriately performing operation on handling of banknotes depending on presence or absence of cooperation between the banknote handling apparatus 5 and the external apparatus.

Variations of Embodiments

The present disclosure is, of course, not limited to those described in the embodiments illustrated above, and various modifications may be added without departing from the purport. The above-described embodiments and variations described below may be combined in any way within an applicable range.

For example, in the second application example of Embodiment 2, the place other than the cassette 32 is the same (withdrawal unit 22) among the first operation example, the second operation example, and the third operation example; however, the place other than the cassette 32 may be varied among the first operation example, the second operation example, and the third operation example. In this case, a clerk may be allowed to select a destination of transport in each of the first operation example, the second operation example, and the third operation example. In the second application example of Embodiment 3 as well, the place other than the cassette 67 may be varied among operations or a clerk may be allowed to select a destination of transport in each operation.

In Embodiment 2, the cassette 32 that is used to refill change fund, to collect rejected coins, and to collect overflow coins is illustrated as a cassette of which the inventory amount is managed by cooperation with the external apparatus according to the present disclosure. Alternatively, a cassette for exclusively collecting rejected coins or a cassette for exclusively collecting overflow coins may be used. When a cassette for exclusively collecting rejected coins is used, the control unit 31 may transport rejected coins in refilling change fund to the cassette when there is cooperation between the coin handling apparatus 2 and the external apparatus and transport rejected coins to a place other than the cassette when there is no cooperation between the coin handling apparatus 2 and the external apparatus. When a cassette for exclusively collecting overflow coins is used, the control unit 31 may transport overflow coins in deposit to the cassette when there is cooperation between the coin handling apparatus 2 and the external apparatus and transport overflow coins to a place other than the cassette when there is no cooperation between the coin handling apparatus 2 and the external apparatus. In Embodiment 3 as well, instead of the cassette 67, a cassette for exclusively collecting rejected banknotes or a cassette for exclusively collecting overflow banknotes may be used.

In Embodiment 2, the recycling storage unit 24 may be configured to be detachably attached to the coin handling apparatus 2, and a destination of transport of coins may be selected in accordance with a cooperation status between the coin handling apparatus 2 and the external apparatus. For example, the control unit 31 may transport coins having been being transported by the transport unit 25 at the time of occurrence of an error to the recycling storage unit 24 when there is cooperation between the coin handling apparatus 2 and the external apparatus and transport coins being transported by the transport unit 25 to a place other than the recycling storage unit 24 when there is no cooperation between the coin handling apparatus 2 and the external apparatus. In Embodiment 3 as well, the recycling storage unit 66 may be configured to be detachably attached to the banknote handling apparatus 5, and a destination of transport of banknotes may be selected in accordance with a cooperation status between the banknote handling apparatus 5 and the external apparatus.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A money handling apparatus, comprising:
- a transport unit that transports money;
- an attachment unit that allows a cassette for storing money to be attached and detached; and
- a control unit that performs predetermined handling on money, wherein
- when performing the predetermined handling, the control unit alternatively selects a destination of transport of money to be transported by the transport unit from between the cassette and a place other than the cassette, based on cooperation information indicating details related to a cooperation status between the money handling apparatus and an external apparatus, the cooperation information including inventory amount information indicating an inventory amount of the cassette, the inventory amount information being information on an amount of money loaded in the cassette by the external apparatus.

2. The money handling apparatus according to claim 1, wherein
- the control unit selects the cassette as the destination of transport in the predetermined handling when the cooperation information acquired is information indicating that the money handling apparatus and the external apparatus are in cooperation with each other, and selects the place other than the cassette as the destination of transport in the predetermined handling when it is not possible to acquire the cooperation information or when the cooperation information acquired is information indicating that the money handling apparatus and the external apparatus are not in cooperation with each other.

3. The money handling apparatus according to claim 1, further comprising:
- a setting unit for setting the cooperation information.

4. The money handling apparatus according to claim 1, wherein
- the cassette comprises a memory unit that stores the cooperation information, and
- the control unit acquires the cooperation information from the memory unit of the cassette attached to the attachment unit.

5. The money handling apparatus according to claim 1, further comprising:
- a communication unit that communicates with the external apparatus, wherein
- the control unit acquires the cooperation information from the external apparatus via the communication unit.

6. The money handling apparatus according to claim 1, further comprising:
- a recognition unit that recognizes money transported by the transport unit; and
- a storage unit that stores money recognized by the recognition unit, wherein the control unit controls the transport unit such that the money stored in the cassette is transported to the recognition unit, and the money recognized as being normal by the recognition unit is transported to the storage unit whereas the money recognized as being abnormal by the recognition unit is transported to the place other than the storage unit, and the predetermined handling includes handling for transporting the money recognized as being abnormal by the recognition unit to the place other than the storage unit.

7. The money handling apparatus according to claim 1, further comprising:

a storage unit that stores money, wherein the control unit controls the transport unit such that the money stored in the cassette is transported to the storage unit when the control unit determines that the money stored in the cassette is allowed to be stored in the storage unit, whereas the money stored in the cassette is transported to the place other than the storage unit when the control unit determines that the money stored in the cassette is not allowed to be stored in the storage unit, and the predetermined handling includes handling for transporting the money determined as being not allowed to be stored in the storage unit, to the place other than the storage unit.

8. The money handling apparatus according to claim 1, wherein the control unit controls the transport unit such that the transport unit interrupts transport of money when an error of handling on money occurs, whereas transport of money having been being transported by the transport unit at time of occurrence of the error is resumed when the error is eliminated, and the predetermined handling includes handling for resuming the transport of money having been being transported by the transport unit at time of occurrence of the error.

9. The money handling apparatus according to claim 1, wherein when a state of money being stored in the cassette shifts to a state of money not being stored in the cassette after the control unit selects the place other than the cassette as the destination of transport, the control unit switches the destination of transport to the cassette when performing the predetermined handling.

10. A money handling method executed by a money handling apparatus comprising a transport unit that transports money and an attachment unit that allows a cassette for storing money to be attached and detached, the money handling method comprising:

when performing predetermined handling on money, alternatively selecting, by the money handling apparatus, a destination of transport of money to be transported by the transport unit from between the cassette and a place other than the cassette, based on cooperation information indicating details related to a cooperation status between the money handling apparatus and an external apparatus, the cooperation information including inventory amount information indicating an inventory amount of the cassette, the inventory amount information being information on an amount of money loaded in the cassette by the external apparatus.

* * * * *